US012559914B2

(12) United States Patent
Otoh

(10) Patent No.: US 12,559,914 B2
(45) Date of Patent: Feb. 24, 2026

(54) EXCAVATOR MANAGEMENT SYSTEM, MOBILE TERMINAL FOR EXCAVATOR, AND RECORDING MEDIUM

(71) Applicant: SUMITOMO CONSTRUCTION MACHINERY CO., LTD., Tokyo (JP)

(72) Inventor: Soutarou Otoh, Chiba (JP)

(73) Assignee: SUMITOMO CONSTRUCTION MACHINERY CO., LTD., Tokyo (JP)

( * ) Notice: Subject to any disclaimer, the term of this patent is extended or adjusted under 35 U.S.C. 154(b) by 180 days.

(21) Appl. No.: 17/660,893

(22) Filed: Apr. 27, 2022

(65) Prior Publication Data

US 2022/0251806 A1      Aug. 11, 2022

Related U.S. Application Data

(63) Continuation of application No. PCT/JP2020/040844, filed on Oct. 30, 2020.

(30) Foreign Application Priority Data

Oct. 31, 2019    (JP) ................................. 2019-199300

(51) Int. Cl.
*E02F 9/26* (2006.01)
*E02F 9/22* (2006.01)
*H04N 5/765* (2006.01)

(52) U.S. Cl.
CPC ............... *E02F 9/26* (2013.01); *H04N 5/765* (2013.01); *E02F 9/2228* (2013.01);
(Continued)

(58) Field of Classification Search
CPC ......... E02F 9/26; E02F 9/2228; E02F 9/2285; E02F 9/2292; E02F 9/2296; E02F 9/205;
(Continued)

(56) References Cited

U.S. PATENT DOCUMENTS 7,433,777 B2      10/2008   Ikari et al.
10,777,027 B2 *   9/2020    Oda ........................ H04N 7/181
(Continued)

FOREIGN PATENT DOCUMENTS

JP            2007-023527           2/2007
JP            2014-013911           1/2014
(Continued)

OTHER PUBLICATIONS

Youtube, VMPPerformance. "How to Datalog Your Car | Tuning Tuesday Season 2 Episode 39". https://www.youtube.com/watch? V=YRyfoAM6XUo. Streamed Oct. 15, 2019.*
(Continued)

*Primary Examiner* — Hunter B Lonsberry
*Assistant Examiner* — Henry R Hinton
(74) *Attorney, Agent, or Firm* — IPUSA, PLLC

(57) ABSTRACT

An excavator management system includes an excavator configured to acquire state quantity information representing a state quantity of the excavator detected by a plurality of sensors; and a mobile terminal. The mobile terminal includes a communication control part configured to transmit, to the excavator, a request signal requesting the excavator to transmit the state quantity information.

19 Claims, 28 Drawing Sheets

(52) U.S. Cl.
CPC ........... *E02F 9/2285* (2013.01); *E02F 9/2292*
(2013.01); *E02F 9/2296* (2013.01)

(58) Field of Classification Search
CPC ... E02F 3/435; E02F 9/24; E02F 9/261; E02F
9/267; E02F 9/2025; H04N 5/765; H04N
5/772; H04N 9/8205; G06Q 10/063;
G06Q 50/02; G06Q 50/08; G06Q 3/0412;
B60Y 2200/412; G06F 3/0412
See application file for complete search history.

(56) References Cited

U.S. PATENT DOCUMENTS

| | | | | |
|---|---|---|---|---|
| 11,145,123 | B1 * | 10/2021 | Chor ...................... | G06V 20/20 |
| 2014/0052349 | A1 * | 2/2014 | Tsukane .................. | E02F 9/267 |
| | | | | 701/50 |
| 2015/0112544 | A1 * | 4/2015 | Tsukamoto ............ | G07C 5/008 |
| | | | | 701/33.2 |
| 2016/0258134 | A1 * | 9/2016 | Matsumoto ............... | B60R 1/26 |
| 2017/0251331 | A1 * | 8/2017 | Green ..................... | H04L 67/12 |
| 2017/0255895 | A1 * | 9/2017 | Kozumi .................. | E02F 9/264 |
| 2017/0280048 | A1 * | 9/2017 | Takahashi ............... | E02F 9/261 |
| 2018/0282970 | A1 | 10/2018 | Koga et al. | |

| | | | | |
|---|---|---|---|---|
| 2018/0295357 | A1 | 10/2018 | Okumura et al. | |
| 2018/0334136 | A1 * | 11/2018 | Chaston ................. | G06V 20/56 |
| 2019/0025787 | A1 * | 1/2019 | Yakushi .................. | B66C 13/46 |
| 2019/0066323 | A1 * | 2/2019 | Li ........................... | G06F 18/22 |
| 2019/0200277 | A1 | 6/2019 | Kinugawa et al. | |
| 2020/0047302 | A1 * | 2/2020 | Kurokawa .......... | B21D 43/021 |
| 2021/0337715 | A1 * | 11/2021 | Fujimoto .............. | A01B 63/111 |

FOREIGN PATENT DOCUMENTS

| | | | | |
|---|---|---|---|---|
| JP | 2017-108429 | | 6/2017 | |
| JP | 2017-166232 | | 9/2017 | |
| JP | 2019-114861 | | 7/2019 | |
| JP | 2019-183646 | | 10/2019 | |
| JP | 2021067614 | A * | 4/2021 | |
| WO | 2012/157603 | | 11/2012 | |
| WO | 2016/125915 | | 8/2016 | |
| WO | 2016/137016 | | 9/2016 | |
| WO | 2017/099070 | | 6/2017 | |

OTHER PUBLICATIONS

International Search Report for PCT/JP2020/040844 mailed on Dec. 22, 2020.

* cited by examiner

SYS

Figure 5:
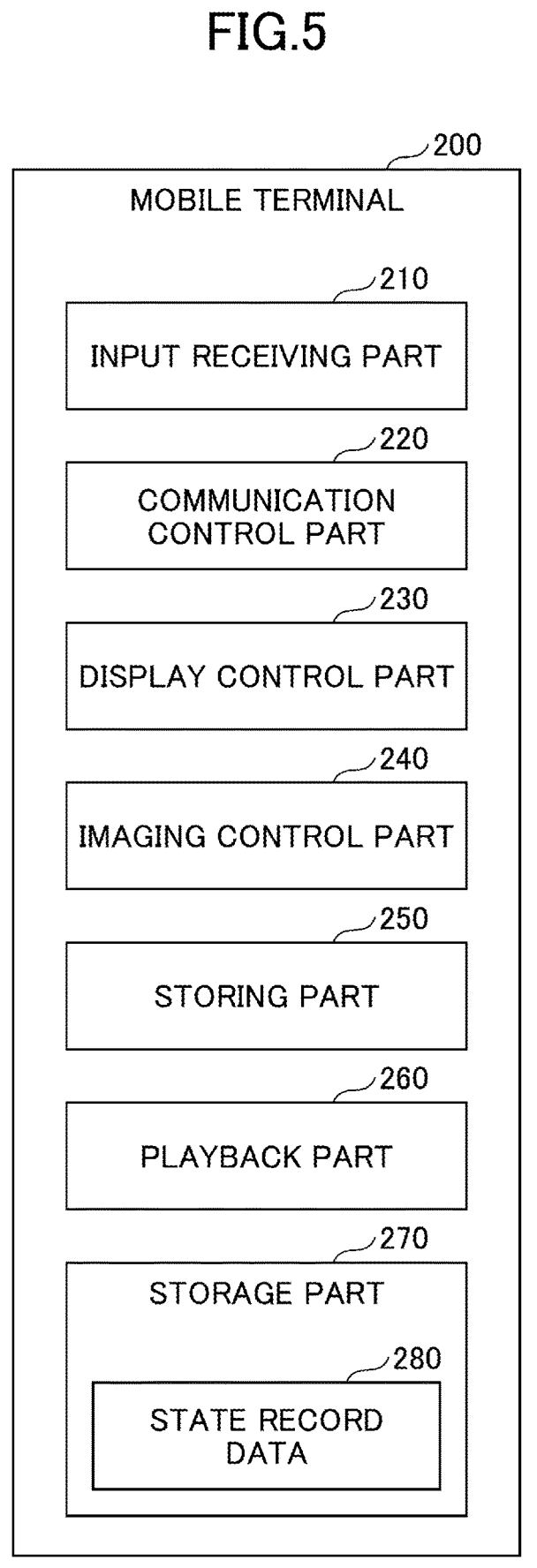

MOBILE TERMINAL

~210

INPUT RECEIVING PART

~220

COMMUNICATION
CONTROL PART

~230

DISPLAY CONTROL PART

~240

IMAGING CONTROL PART

~250

STORING PART

~260

PLAYBACK PART

~270

STORAGE PART

~280

STATE RECORD
DATA

EXCAVATOR MANAGEMENT SYSTEM, MOBILE TERMINAL FOR EXCAVATOR, AND RECORDING MEDIUM

CROSS-REFERENCE TO RELATED APPLICATION

The present application is a continuation application of International Application No. PCT/JP2020/040844 filed on Oct. 30, 2020, which is based on and claims priority to Japanese Patent Application No. 2019-199300 filed on Oct. 31, 2019. The contents of these applications are incorporated herein by reference in their entirety.

BACKGROUND

1. Technical Field

The present invention relates to an excavator management system, a mobile terminal for an excavator, and a recording medium.

2. Description of the Related Art

There is a conventional technology in which, among image data of a hydraulic excavator captured by an imaging device, image data when a detection value detected by a sensor is determined to be abnormal is stored in a storage device so that the corresponding image data can be confirmed by an output device.

SUMMARY

According to an embodiment of the present invention, an excavator management system including an excavator configured to acquire state quantity information representing a state quantity of the excavator detected by a plurality of sensors; and a mobile terminal, wherein the mobile terminal includes a communication control part configured to transmit, to the excavator, a request signal requesting the excavator to transmit the state quantity information.

BRIEF DESCRIPTION OF THE DRAWINGS

FIG. 4 is a diagram illustrating an example of a hardware configuration of a mobile terminal;

FIG. 5 is a diagram illustrating a function of a mobile terminal;

DETAILED DESCRIPTION

The conventional technology allows a user such as an operator, an administrator, or the like, to confirm only the images during the period around the time of the identified abnormality. That is, the conventional technology allows the user to confirm the images only when an abnormality occurs. Further, the conventional technology does not allow the user to confirm the operation data of the excavator with a mobile terminal at the work site.

Therefore, it is desirable to make it possible to confirm the state of the excavator when the excavator was operating.

Hereinafter, one embodiment will be described with reference to the drawings.

Embodiment

Figure 1:
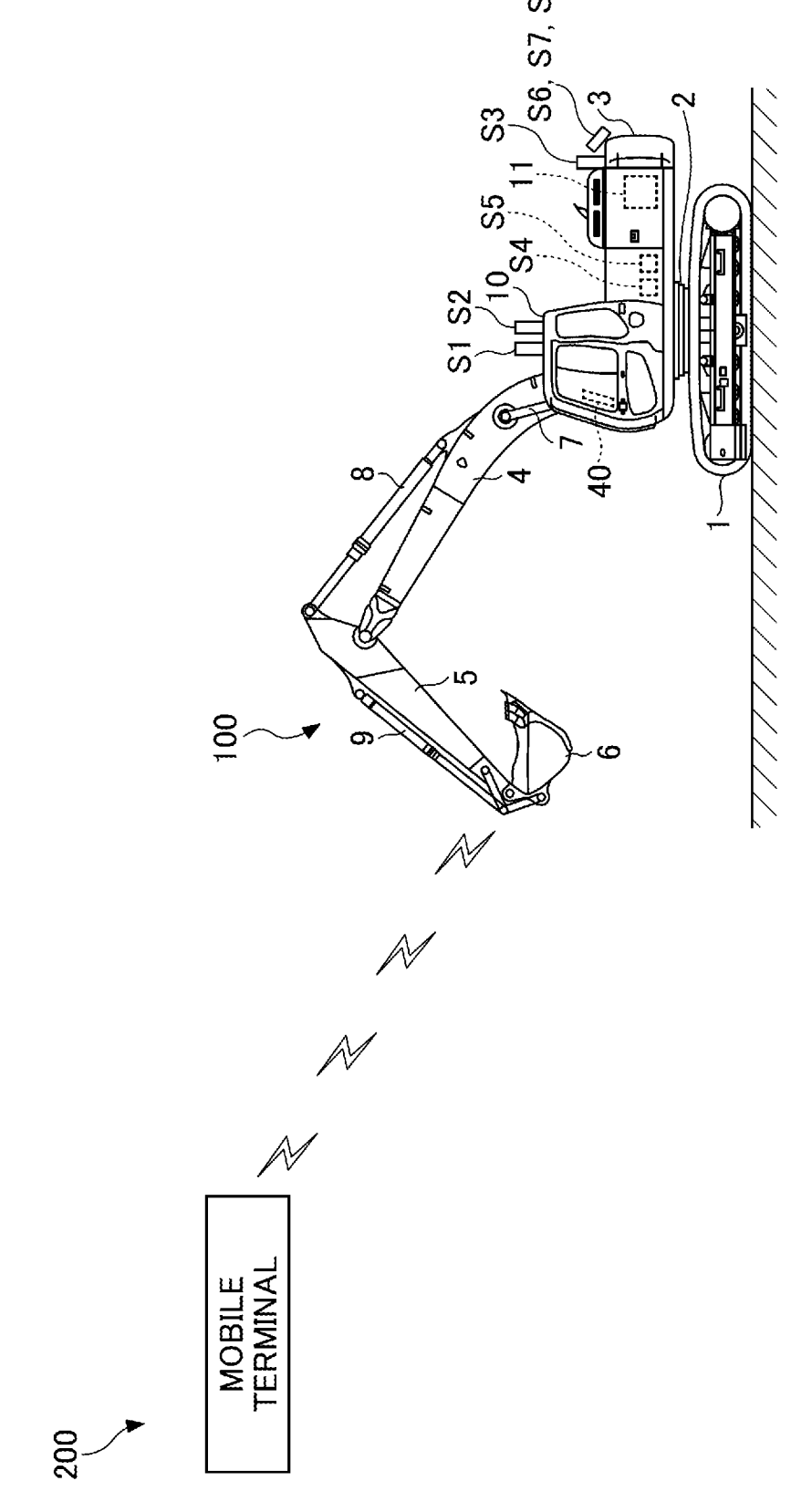
FIG. 1 is a schematic diagram illustrating an example of a configuration of an excavator management system according to an embodiment.

FIG. 1 is a schematic diagram illustrating an example of a configuration of an excavator management system according to an embodiment. An excavator management system SYS illustrated in FIG. 1 is a system that uses a mobile terminal 200 (an example of a "mobile terminal for an excavator") to manage the state quantity of the excavator. The excavator management system SYS includes an excavator 100 and the mobile terminal 200.

The excavator 100 includes a lower traveling body 1, a turning mechanism 2, an upper turning body 3, a boom 4, an arm 5, a bucket 6, a boom cylinder 7, an arm cylinder 8, a bucket cylinder 9, a cabin 10, and an engine 11.

The upper turning body 3 is turnably mounted to the lower traveling body 1 via the turning mechanism 2. The boom 4 is attached to the upper turning body 3. The arm 5 is attached to the leading end of the boom 4. The bucket 6 is attached to the leading end of the arm 5.

The boom 4, the arm 5, and the bucket 6 constitute a drilling attachment. The boom 4, the arm 5, and the bucket 6 are hydraulically driven by the boom cylinder 7, the arm cylinder 8, and the bucket cylinder 9, respectively. The cabin 10 and the engine 11 are mounted on the upper turning body 3.

The excavator 100 includes a transmitting device S1, a receiving device S2, a positioning device S3, a posture detecting device S4, an orientation detecting device S5, a camera S6, a microphone S7, an object detecting device S8, and a display device 45.

The transmitting device S1 transmits information to a device external to the excavator 100 by wireless communication. For example, the transmitting device S1 transmits the state quantity information representing the state quantity of the excavator 100 to the mobile terminal 200 in response to a request from the mobile terminal 200. The state quantity information represents, in time series, a plurality of state quantities continuously acquired by a sensor at fixed time intervals. More specifically, the state quantity information according to the present embodiment includes values output from the posture detecting device S4, the orientation detecting device S5, the camera S6 as a surrounding area monitoring device, the microphone S7, and the object detecting device S8.

The transmitting device S1 according to the present embodiment may transmit operation data including the state quantity information to the mobile terminal 200. The operation data includes state quantity information, setting condition information representing various setting conditions set for the excavator 100, the machine number for identifying the excavator 100, and the like.

The receiving device S2 receives information from a device external to the excavator 100 by wireless communication. For example, the receiving device S2 receives a request signal transmitted from the mobile terminal 200 for requesting the state quantity information representing the state quantity of the excavator 100.

The positioning device S3 acquires information concerning the position of the excavator 100. In the present embodiment, the positioning device S3 is a GNSS (GPS) receiver and can measure the latitude, longitude, and altitude of the location of the excavator 100.

The posture detecting device S4 detects the posture of the drilling attachment included in the excavator 100. In the present embodiment, as the posture detecting device S4, a boom angle sensor for detecting the boom angle, an arm angle sensor for detecting the arm angle, a bucket angle sensor for detecting the bucket angle, and a machine body tilt sensor for detecting the tilt angle of the upper turning body 3 are used. The boom angle sensor may include, for example, a rotary encoder, an acceleration sensor, a 6-axis sensor, an IMU (Inertial Measurement Unit), or the like, and the same applies to the arm angle sensor, the bucket angle sensor, and the machine body tilt sensor. The detection signal detected by the posture detecting device S4 is loaded into the controller 30.

The orientation detecting device S5 detects the direction of the excavator 100. As the orientation detecting device S5, for example, a geomagnetic sensor, a resolver or encoder with respect to the turning axis of the turning mechanism 2, a gyro sensor, or the like, is used. In this way, the position of the claw tip or the position of the rear surface of the bucket can be calculated as a work portion. As the reference coordinate system used as the position information of the work portion, for example, a world geodetic system may be used.

The camera S6 as the surrounding area monitoring device is configured to detect an object present within a predetermined distance around the excavator 100. Objects include, for example, people, animals, vehicles, construction machines, buildings, walls, fences, holes, or the like. Surrounding area monitoring devices include, for example, ultrasonic sensors, millimeter wave radars, stereo cameras, LIDAR, distance image sensors, infrared sensors, and the like. In the present embodiment, the camera S6 is indicated as the surrounding area monitoring device. The camera S6 is provided in the upper turning body 3 and captures an image of the area around the excavator 100. The excavator 100 of the present embodiment includes a plurality of cameras S6 by which images of areas in multiple directions (e.g., front, rear, right, and left directions) from the excavator 100 can be captured.

The microphone S7 is provided in the upper turning body 3 and acquires the operation sound emitted by the excavator 100. The microphone S7 may be provided at each of a plurality of positions on the upper turning body 3.

The object detecting device S8 is configured to detect an object present around the excavator 100. The object detecting device S8 may be configured to calculate a distance from the object detecting device S8 or the excavator 100 to the recognized object. Objects include, for example, people, animals, vehicles, construction machines, buildings, holes, and the like. The object detecting device S8 includes, for example, ultrasonic sensors, millimeter wave radars, stereo cameras, LIDAR, distance image sensors, infrared sensors, and the like. In the present embodiment, the object detecting device S8 is attached to the front end of the upper surface of the cabin 10, the rear end of the upper surface of the upper turning body 3, the left end of the upper surface of the upper turning body 3, and the right end of the upper surface of the upper turning body 3.

The object detecting device S8 may be configured to detect a predetermined object within a predetermined area set around the perimeter of the excavator 100. For example, the object detecting device S8 may be configured to distinguish between a person and an object other than a person.

The display device 45 is disposed in the vicinity of the operator's seat within the cabin 10 to display various kinds of information. For example, the display device 45 displays an image captured by the camera S6. The display device 45 can also display a composite image of a plurality of images captured by a plurality of cameras S6. The display device 45 may display a composite image to which various kinds of image processing are performed, such as a viewpoint conversion process.

The mobile terminal 200 is an electronic device carried by a user. Examples of the mobile terminals 200 include smartphones, video cameras, mobile phones, laptop PCs, tablet terminals, smart glass, and the like. In the present embodiment, a smartphone is used as the mobile terminal 200.

In the excavator management system SYS according to the present embodiment, the mobile terminal 200 captures a video of the state of the excavator 100 in operation. The mobile terminal 200 according to the present embodiment transmits a request for acquiring the state quantity information to the excavator 100 and receives the state quantity information from the excavator 100.

At this time, the mobile terminal 200 synchronizes the timing of starting the capturing of the video with the timing of receiving the state quantity information from the excavator 100, and stores state record data in which the video data representing the captured video and the state quantity information are associated with each other.

The mobile terminal 200 according to the present embodiment may record a sound input simultaneously with the recording of a video by a sound input/output device 203. The sound data representing the recorded sound may be stored in association with the video data and the state quantity information.

That is, the state record data includes the operation data including the state quantity information and the setting condition information of the excavator 100, the video data capturing how the excavator 100 operates, and the sound data recorded when the excavator 100 operates. That is, the state record data includes state quantity information and video data indicating a video including the video of the excavator 100 and the sound emitted while capturing the video.

Accordingly, the state record data according to the present embodiment is information including the state quantity information when the excavator 100 was in operation, the setting condition information, the video data of a video capturing the excavator 100 in operation, and the sound data, and can be regarded as information indicating the state when the excavator 100 was in operation.

According to the present embodiment, the video data may include the sound data recorded by the sound input/output device 203. In the following description, the video data includes the sound data input from the sound input/output device 203. However, the video data and the sound data may be managed as separate data. Details of the mobile terminal 200 are described below.

Figure 2:
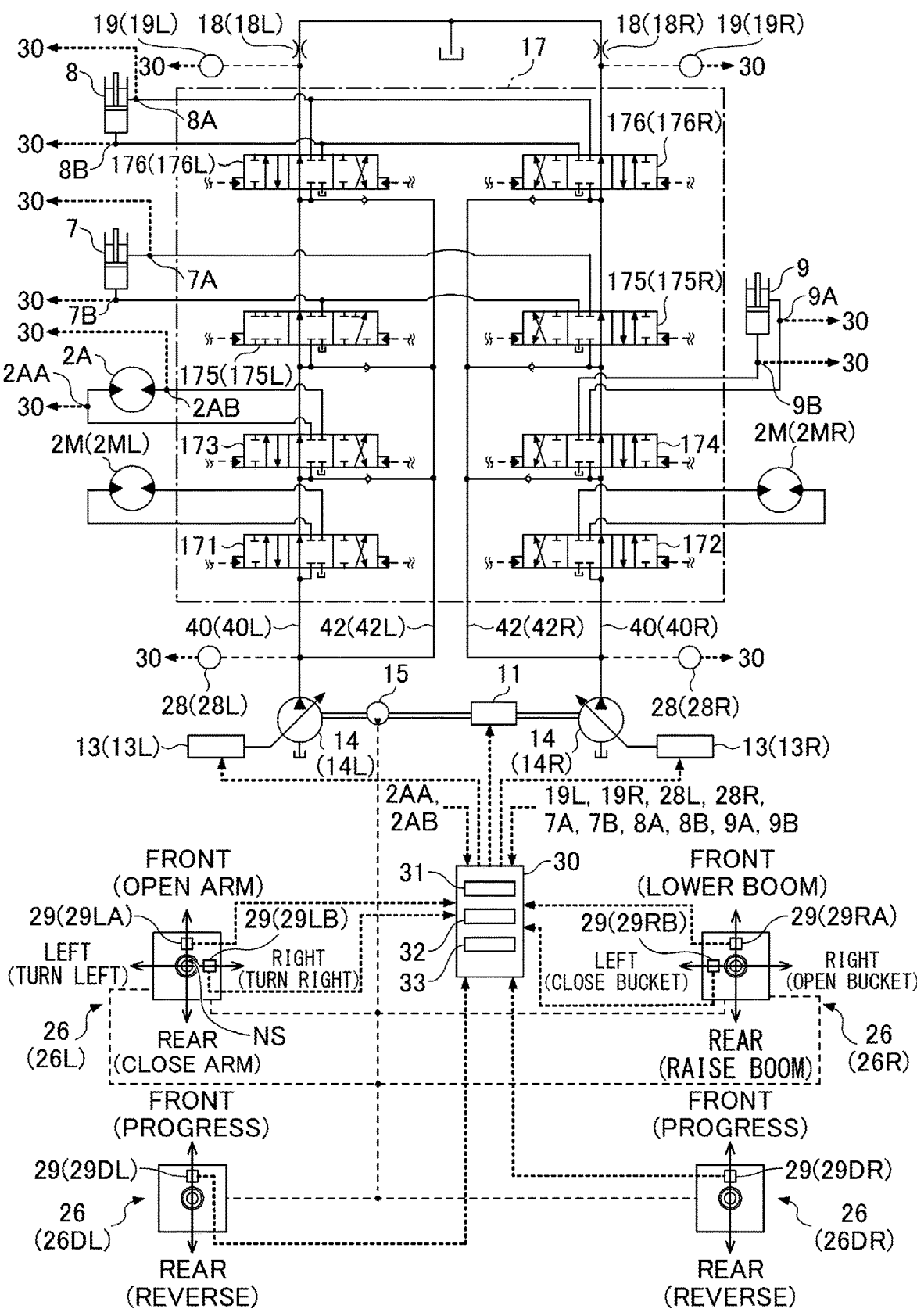
FIG. 2 is a diagram illustrating an example of a configuration of a hydraulic system mounted on an excavator.

Next, a configuration example of the hydraulic system mounted on the excavator 100 will be described with reference to FIG. 2. FIG. 2 is a diagram illustrating an example of a configuration of a hydraulic system mounted on an excavator. FIG. 2 illustrates the mechanical power transmission system, a hydraulic oil line, a pilot line, and an electric control system, with double lines, solid lines, dashed lines, and dotted lines, respectively.

The hydraulic system of the excavator 100 primarily includes an engine 11, a regulator 13, a main pump 14, a pilot pump 15, a control valve 17, an operation device 26, a discharge pressure sensor 28, an operation pressure sensor 29, a controller 30, and the like.

In FIG. 2, the hydraulic system circulates the hydraulic oil from the main pump 14 which is driven by the engine 11, to the hydraulic oil tank via a center bypass line 40 or a parallel line 42.

The engine 11 is the driving source of the excavator 100. In the present embodiment, the engine 11 is, for example, a diesel engine that operates to maintain a predetermined revolution speed. The output shaft of the engine 11 is coupled to the respective input shafts of the main pump 14 and the pilot pump 15.

The main pump 14 is configured to supply hydraulic oil to the control valve 17 via a hydraulic oil line. In the present embodiment, the main pump 14 is a swash plate type variable displacement hydraulic pump.

The regulator 13 is configured to control the discharge amount (push-back volume) of the main pump 14. In the present embodiment, the regulator 13 controls the discharge amount (push-back volume) of the main pump 14 by adjusting the swash plate tilt angle of the main pump 14 in response to a control instruction from the controller 30.

The pilot pump 15 is configured to supply hydraulic oil to a hydraulic control device including the operation device 26 via a pilot line. In the present embodiment, the pilot pump 15 is a fixed capacitive hydraulic pump. However, the pilot pump 15 may be omitted. In this case, the function performed by the pilot pump 15 may be implemented by the main pump 14. That is, the main pump 14 may be provided with a function of supplying hydraulic oil to the control valve 17, as well as a function of supplying hydraulic oil to the operation device 26 or the like after the pressure of the hydraulic oil is lowered by a diaphragm or the like.

The control valve 17 is configured to control the flow of hydraulic oil in the hydraulic system. In the present embodiment, the control valve 17 includes control valves 171 to 176. The control valve 175 includes a control valve 175L and a control valve 175R, and the control valve 176 includes a control valve 176L and a control valve 176R. The control valve 17 may selectively supply the hydraulic oil discharged by the main pump 14 to one or more hydraulic actuators through the control valves 171 to 176. The control valves 171 to 176 control the flow rate of hydraulic oil flowing from the main pump 14 to the hydraulic actuator and the flow rate of hydraulic oil flowing from the hydraulic actuator to the hydraulic oil tank. Hydraulic actuators include the boom cylinder 7, the arm cylinder 8, the bucket cylinder 9, a left traveling hydraulic motor 2ML, a right traveling hydraulic motor 2MR, and a turning hydraulic motor 2A.

The operation device 26 is a device used by an operator for operating an actuator. The actuator includes at least one of a hydraulic actuator and an electric actuator. In the present embodiment, the control device 26 supplies the hydraulic oil discharged by the pilot pump 15 via a pilot line to the pilot port of the corresponding control valve in the control valve 17. The pressure (pilot pressure) of the hydraulic oil supplied to each of the pilot ports is a pressure in accordance with the direction and amount of operations with respect to the levers or pedals (not illustrated) of the operation device 26 corresponding to each of the hydraulic actuators. However, the control device 26 may alternatively be an electrical control type instead of the above-described pilot pressure type. In this case, the control valve in the control valve 17 may be a solenoid spool valve.

The discharge pressure sensor 28 is configured to detect the discharge pressure of the main pump 14. In the present embodiment, the discharge pressure sensor 28 outputs the detection value to the controller 30.

The operation pressure sensor 29 is configured to detect the contents of an operation of the operation device 26 by an operator. In the present embodiment, the operation pressure sensor 29 detects, in the form of pressure (operation pressure), the operation direction and amount of the operation of the lever or pedal of the operation device 26 corresponding to each of the actuators, and outputs the detection value as operation data to the controller 30. The contents of the operation of the operation device 26 may be detected using other sensors other than the operation pressure sensor.

The main pump 14 includes a left main pump 14L and a right main pump 14R. The left main pump 14L is configured to circulate the hydraulic oil through a left center bypass line 40L or a left parallel line 42L to the hydraulic oil tank. The right main pump 14R is configured to circulate the hydraulic oil through a right center bypass line 40R or a right parallel line 42R to the hydraulic oil tank.

The left center bypass line 40L is a hydraulic oil line passing through the control valves 171, 173, 175L, and 176L disposed within the control valve 17. The right center bypass line 40R is a hydraulic oil line passing through control valves 172, 174, 175R, and 176R disposed within the control valve 17.

The control valve 171 is a spool valve which supplies hydraulic oil discharged by the left main pump 14L to the left traveling hydraulic motor 2ML and switches the flow of hydraulic oil in order to discharge the hydraulic oil discharged by the left traveling hydraulic motor 2ML to the hydraulic oil tank.

The control valve 172 is a spool valve that supplies hydraulic oil discharged by the right main pump 14R to the right traveling hydraulic motor 2MR and switches the flow of hydraulic oil in order to discharge the hydraulic oil discharged by the right traveling hydraulic motor 2MR to the hydraulic oil tank.

The control valve 173 is a spool valve which supplies hydraulic oil discharged by the left main pump 14L to the turning hydraulic motor 2A and switches the flow of hydraulic oil in order to discharge the hydraulic oil discharged by the turning hydraulic motor 2A to the hydraulic oil tank.

The control valve 174 is a spool valve which supplies the hydraulic oil discharged by the right main pump 14R to the bucket cylinder 9 and switches the flow of hydraulic oil in order to discharge the hydraulic oil in the bucket cylinder 9 to the hydraulic oil tank.

The control valve 175L is a spool valve which switches the flow of hydraulic oil in order to supply the hydraulic oil discharged by the left main pump 14L to the boom cylinder 7. The control valve 175R is a spool valve which supplies hydraulic oil discharged by the right main pump 14R to the boom cylinder 7 and switches the flow of hydraulic oil in order to discharge the hydraulic oil in the boom cylinder 7 to the hydraulic oil tank.

The control valve 176L is a spool valve which supplies the hydraulic oil discharged by the left main pump 14L to the arm cylinder 8 and switches the flow of hydraulic oil in order to discharge the hydraulic oil in the arm cylinder 8 to the hydraulic oil tank.

The control valve 176R is a spool valve which supplies the hydraulic oil discharged by the right main pump 14R to the arm cylinder 8 and switches the flow of hydraulic oil in order to discharge the hydraulic oil in the arm cylinder 8 to the hydraulic oil tank.

The left parallel line 42L is a hydraulic oil line parallel to the left center bypass line 40L. The left parallel line 42L can supply hydraulic oil to the control valve further downstream, when the flow of hydraulic oil flowing through the left center bypass line 40L is limited or blocked by any one of the control valves 171, 173, or 175L. The right parallel line 42R is a hydraulic oil line parallel to the right center bypass line 40R. The right parallel line 42R can supply hydraulic oil to a control valve further downstream, when the flow of hydraulic oil flowing through the right center bypass line 40R is limited or blocked by any one of the control valves 172, 174, or 175R.

The regulator 13 includes a left regulator 13L and a right regulator 13R. The left regulator 13L controls the discharge amount of the left main pump 14L by adjusting the swash plate tilt angle of the left main pump 14L in accordance with the discharge pressure of the left main pump 14L. Specifically, for example, the left regulator 13L adjusts the swash plate tilt angle of the left main pump 14L according to an increase in the discharge pressure of the left main pump 14L to reduce the discharge amount. The same applies to the right regulator 13R. This is to prevent the absorbing horsepower of the main pump 14, which is expressed as the product of the discharge pressure and the discharge amount, from exceeding the output horsepower of the engine 11.

The operation device 26 includes a left operation lever 26L, a right operation lever 26R, and a traveling lever 26D. The traveling lever 26D includes a left traveling lever 26DL and a right traveling lever 26DR.

The left operation lever 26L is used for the turning operation and the operation of the arm 5. The left operation lever 26L, when operated in the forward-backward direction, uses hydraulic oil discharged by the pilot pump 15 to apply a control pressure according to the lever operation amount to the pilot port of the control valve 176. When operated in the right-left direction, the hydraulic oil discharged by the pilot pump 15 is used to apply the control pressure according to the lever operation amount, to the pilot port of the control valve 173.

Specifically, the left operation lever 26L, when operated in the arm closing direction, introduces hydraulic oil to the right pilot port of the control valve 176L and introduces hydraulic oil to the left pilot port of the control valve 176R. The left operation lever 26L, when operated in the arm opening direction, introduces hydraulic oil to the left pilot port of the control valve 176L and introduces hydraulic oil to the right pilot port of the control valve 176R. The left operation lever 26L, when operated in the left turning direction, introduces hydraulic oil to the left pilot port of the control valve 173, and when operated in the right turning direction, introduces hydraulic oil to the right pilot port of the control valve 173.

The right operation lever 26R is used to operate the boom 4 and the bucket 6. The right operation lever 26R, when operated in a forward-backward direction, uses hydraulic oil discharged by the pilot pump 15 to apply a control pressure according to the lever operation amount to the pilot port of the control valve 175. The right operation lever 26R, when operated in the left-right direction, uses the hydraulic oil discharged by the pilot pump 15 to apply the control pressure according to the lever operation amount to the pilot port of the control valve 174.

Specifically, the right operation lever 26R, when operated in the boom lowering direction, introduces hydraulic oil to the right pilot port of the control valve 175R. The right operation lever 26R, when operated in the boom raising direction, introduces hydraulic oil to the right pilot port of control valve 175L and introduces hydraulic oil to the left pilot port of control valve 175R. The right operation lever 26R, when operated in the bucket closing direction, introduces hydraulic oil to the left pilot port of the control valve 174, and when operated in the bucket opening direction, introduces hydraulic oil to the right pilot port of the control valve 174.

The traveling lever 26D is used to operate a crawler 1C. Specifically, the left traveling lever 26DL is used to operate a left crawler 1CL. The left traveling lever 26DL may be configured to interlock with the left traveling pedal. The left traveling lever 26DL, when operated in a forward-backward direction, uses hydraulic oil discharged by the pilot pump 15 to apply a control pressure according to the lever operation amount, to the pilot port of the control valve 171. The right traveling lever 26DR is used to operate a right crawler 1CR. The right traveling lever 26DR may be configured to interlock with the right traveling pedal. The right traveling lever 26DR, when operated in a forward-backward direction, uses hydraulic oil discharged by the pilot pump 15 to apply a control pressure according to the lever operation amount, to the pilot port of the control valve 172.

The discharge pressure sensor 28 includes a discharge pressure sensor 28L and a discharge pressure sensor 28R. The discharge pressure sensor 28L detects the discharge pressure of the left main pump 14L and outputs a detection value to the controller 30. The discharge pressure sensor 28R detects the discharge pressure of the right main pump 14R and outputs a detection value to the controller 30.

The operation pressure sensor 29 includes operation pressure sensors 29LA, 29LB, 29RA, 29RB, 29DL, and 29DR. The operation pressure sensor 29LA detects the contents of the operation in the forward-backward direction by the operator to the left operation lever 26L in the form of pressure and outputs the detection value to the controller 30. The contents of the operation are, for example, the lever operation direction, the lever operation amount (lever operation angle) and the like.

Similarly, the operation pressure sensor 29LB detects the contents of the operator's left-to-right operation to the left operation lever 26L in the form of pressure and outputs the detection value to the controller 30. The operation pressure sensor 29RA detects the contents of the operator's operation in the forward-backward direction to the right operation lever 26R in the form of pressure and outputs the detection value to the controller 30. The operation pressure sensor 29RB detects the contents of the operation by the operator in the left-right direction to the right operation lever 26R in the form of pressure and outputs the detection value to the controller 30. The operation pressure sensor 29DL detects the contents of the operation in the forward-backward direction to the left traveling lever 26DL by the operator in the form of pressure and outputs the detection value to the controller 30. The operation pressure sensor 29DR detects the contents of the operation in the forward-backward direction to the right traveling lever 26DR by the operator in the form of pressure and outputs the detection value to the controller 30.

The controller 30 receives the output of the operation pressure sensor 29 and outputs a control instruction to the regulator 13 as needed to change the discharge amount of the main pump 14. The controller 30 receives the output of the control pressure sensor 19 provided upstream of a diaphragm 18, outputs a control instruction to the regulator 13 according to need, and changes the discharge amount of the main pump 14. The diaphragm 18 includes a left diaphragm 18L and a right diaphragm 18R, and the control pressure sensor 19 includes a left control pressure sensor 19L and a right control pressure sensor 19R.

In the left center bypass line 40L, the left diaphragm 18L is disposed between the control valve 176L, which is the most downstream, and the hydraulic oil tank. Therefore, the flow of hydraulic oil discharged by the left main pump 14L is limited by the left diaphragm 18L. The left diaphragm 18L causes a control pressure for controlling the left regulator 13L. The left control pressure sensor 19L is a sensor for detecting this control pressure and outputs a detection value to the controller 30. The controller 30 controls the discharge amount of the left main pump 14L by adjusting the tilt angle of the swash plate of the left main pump 14L according to the control pressure. The controller 30 decreases the discharge amount of the left main pump 14L as the control pressure increases, and increases the discharge amount of the left main pump 14L as the control pressure decreases. The discharge amount of the right main pump 14R is similarly controlled.

Specifically, when all of the hydraulic actuators at the excavator 100 are in the standby state without being operated as illustrated in FIG. 2, the hydraulic oil discharged by the left main pump 14L passes through the left center bypass line 40L and reaches the left diaphragm 18L. The flow of hydraulic oil discharged by the left main pump 14L increases the control pressure generated upstream of the left diaphragm 18L. As a result, the controller 30 reduces the discharge amount of the left main pump 14L to the allowable minimum discharge amount and prevents a pressure loss (pumping loss) when the hydraulic oil discharged by the left main pump 14L passes through the left center bypass line 40L.

On the other hand, when any of the hydraulic actuators is operated, the hydraulic oil discharged by the left main pump 14L flows into the hydraulic actuator that is the operation target through a control valve corresponding to the hydraulic actuator that is the operation target. The flow of hydraulic oil discharged by the left main pump 14L decreases or eliminates the amount reaching the left diaphragm 18L, thereby lowering the control pressure generated upstream of the left diaphragm 18L. As a result, the controller 30 increases the discharge amount of the left main pump 14L to allow sufficient hydraulic oil to flow into the hydraulic actuator that is the operation target to ensure the driving of the hydraulic actuator that is the operation target. The controller 30 controls the discharge amount of the right main pump 14R in the same manner.

The controller 30 receives the detection values of the pressure sensor 7A for detecting the pressure in the rod-side oil chamber of the boom cylinder 7, the pressure sensor 7B for detecting the pressure in the bottom-side oil chamber of the boom cylinder 7, the pressure sensor 8A for detecting the pressure in the rod-side oil chamber of the arm cylinder 8, the pressure sensor 8B for detecting the pressure in the bottom-side oil chamber of the arm cylinder 8, the pressure sensor 9A for detecting the pressure in the rod-side oil chamber of the bucket cylinder 9, and the pressure sensor 9B for detecting the pressure in the bottom-side oil chamber of the bucket cylinder 9. This allows the controller 30 to detect the pressure in the rod-side oil chamber and bottom-side oil chamber of each of the boom cylinder 7, the arm cylinder 8, and the bucket cylinder 9.

The controller 30 receives the detection values of a pressure sensor 2AA for detecting the hydraulic pressure during the left turning of the turning hydraulic motor 2A and a pressure sensor 2AB for detecting the hydraulic pressure during the right turning of the turning hydraulic motor 2A. This allows the controller 30 to detect the hydraulic pressure at the time of the left and right turning of the turning hydraulic motor 2A.

With the configuration described above, the hydraulic system of FIG. 2 can reduce wasteful energy consumption with respect to the main pump 14 in standby mode. Wasteful energy consumption includes pumping loss caused in the center bypass line 40 by the hydraulic oil discharged by the main pump 14. When the hydraulic actuator is operated, the hydraulic system of FIG. 2 ensures that sufficient hydraulic oil is supplied from the main pump 14 to the hydraulic actuator to be operated.

The functions of the controller 30 will now be described. As illustrated in FIG. 2, the controller 30 includes an acquiring part 31, a reception control part 32, and a transmission control part 33.

The acquiring part 31 acquires the detection value of each of the plurality of sensors of the excavator 100 as the state quantity information representing the state quantity of the excavator 100. The state quantity information acquired by the acquiring part 31 includes, for example, the hydraulic oil temperature, the engine water temperature, the engine fuel injection amount, the hydraulic pressure of the boom cylinder 7, the hydraulic pressure of the arm cylinder 8, the hydraulic pressure of the bucket cylinder 9, the hydraulic pressure of the turning hydraulic motor 2A, the discharge pressure of the main pump 14, the operation pressure of each operation lever, and the control pressure of the regulator 13. However, the state quantity information acquired by the acquiring part 31 is not limited thereto. The state quantity information may be other information as long as the information is detected by a sensor included in the excavator 100. For example, the acquiring part 31 is implemented by a memory included in the controller 30.

The acquiring part 31 acquires setting condition information representing various setting conditions set for the excavator 100 and information representing the machine number for identifying the excavator 100. That is, the acquiring part 31 acquires the operation data of the excavator 100.

The reception control part 32 receives a request signal (a request signal for requesting transmission of the state quantity information) transmitted from the mobile terminal 200 through wireless communication with the mobile terminal 200 by the receiving device S2. For example, the reception control part 32 is implemented by a CPU executing a program in the controller 30.

When the request signal is received by the reception control part 32, the transmission control part 33 transmits the operation data acquired by the acquiring part 31 to the mobile terminal 200 through wireless communication with the mobile terminal 200 by the transmitting device S1. For example, the transmission control part 33 is implemented by executing a program by the CPU in the controller 30.

Figure 3:
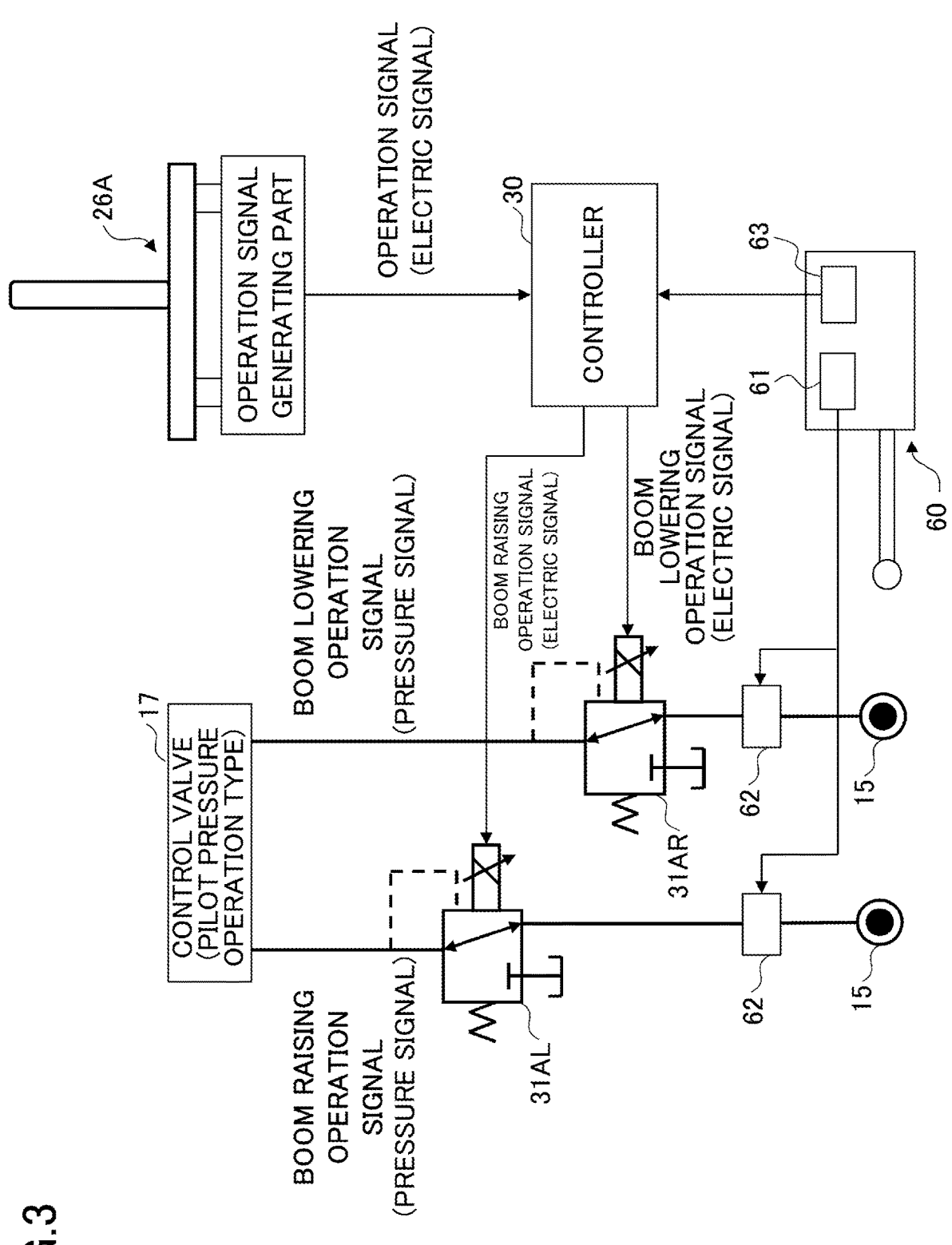
FIG. 3 is a diagram schematically illustrating an example of a configuration of an electric operation system of an excavator.

Referring now to FIG. 3, an electric operating system of the excavator 100 will be further described. FIG. 3 is a schematic diagram illustrating an example of a configuration of an electric operation system of an excavator. In FIG. 3, as an example of an electric operation system, a boom operation system that moves the boom 4 up and down will be described as an example.

The electric operation system may also be applied in a similar manner to a traveling operation system for moving the lower traveling body 1 forward and backward, a turning operation system for turning the upper turning body 3, an arm operation system for opening and closing the arm 5, and a bucket operation system for opening and closing the bucket 6.

The electric operation system illustrated in FIG. 3 includes a boom operation lever 26A as an electric operation lever, the pilot pump 15, the pilot-pressure-operated control valve 17, a proportional valve 31AL for an operation of raising the boom, a proportional valve 31AR for an operation of lowering the boom, the controller 30, a gate lock lever 60, and a gate lock valve 62.

The boom operation lever 26A (the operation signal generating part), which is an example of the operation device, is provided with a sensor such as an encoder or a potentiometer capable of detecting an operation amount (tilt amount) or a tilt direction. Operation signals (electric signals) corresponding to the operation of the boom operation lever 26A detected by the sensors of the boom operation lever 26A are loaded into the controller 30.

The proportional valve 31AL is provided in a pilot line for supplying hydraulic oil from the pilot pump 15 to a pilot port on the boom raising side of the control valve 17 (see control valves 175L and 175R illustrated in FIG. 2). The proportional valve 31AL is a solenoid valve capable of adjusting the opening degree, and the opening degree of the proportional valve 31AL is controlled in accordance with a boom raising operation signal (an electric signal) which is a control signal from the controller 30.

By controlling the opening degree of the proportional valve 31AL, the pilot pressure as a boom raising operation signal (pressure signal) acting on the pilot port on the boom raising side is controlled. Similarly, the proportional valve 31AR is provided in a pilot line for supplying hydraulic oil from the pilot pump 15 to the pilot port on the boom lowering side of the control valve (see the control valves 175L and 175R illustrated in FIG. 2). The proportional valve 31AR is a solenoid valve capable of adjusting the opening degree, and the opening degree of the proportional valve 31AR is controlled in accordance with a boom-lowering operation signal (an electric signal) which is a control signal from the controller 30. By controlling the opening degree of the proportional valve 31AR, the pilot pressure as a boom lowering operation signal (pressure signal) acting on the pilot port at the boom lowering side is controlled.

The controller 30 outputs boom raising operation signals (electric signals) and boom lowering operation signals (electric signals) that control the opening degree of the proportional valves 31AL and 31AR. Thus, the controller 30 can control the operation of the boom 4 by controlling the flow rate and flow direction of the hydraulic oil supplied from the main pumps 14L and 14R to the boom cylinder 7 through the proportional valves 31AL and 31AR and the control valves 17 (the control valves 175L and 175R).

For example, if the excavator 100 is manually operated, the controller 30 generates and outputs a boom raising operation signal (an electric signal) or a boom lowering operation signal (an electric signal) according to the operation signal (an electric signal) of the boom operation lever 26A. For example, when automatic control of the excavator 100 is performed, the controller 30 generates and outputs a boom raising operation signal (electric signal) or a boom lowering operation signal (electric signal) based on a set program or the like.

The gate lock lever 60 is provided near the entrance in the cabin 10. The gate lock lever 60 is provided to oscillate between an unlocked state and a locked state. The operator makes the gate lock lever 60 unlocked by pulling the gate lock lever 60 up to approximately level and locks the gate lock lever 60 by pushing the gate lock lever 60 down. In the unlocked state, the gate lock lever 60 restricts the operator from exiting the cabin 10 by blocking the entrance of the cabin 10. On the other hand, in a locked state, the gate lock lever 60 opens the entrance of the cabin 10 to allow the operator to exit from the cabin 10.

A limit switch 61 is a switch that is turned ON (energized) when the gate lock lever 60 is in the unlocked state and is turned OFF (cut off) when the gate lock lever 60 is in the locked state.

The gate lock valve 62 is an open/close valve provided on the pilot line between the pilot pump 15 and the proportional valves (31AL, 31AR). The gate lock valve 62 is, for example, a solenoid valve that opens when energized and closes when not energized. The limit switch 61 is disposed in the power supply circuit of the gate lock valve 62. Thus, when the limit switch 61 is turned ON, the gate lock valve 62 opens. When the limit switch 61 is turned OFF, the gate lock valve 62 closes. That is, the gate lock valve 62 opens when the gate lock lever 60 is unlocked. On the other hand, the gate lock valve 62 closes when the gate lock lever 60 is locked.

A lock state detecting sensor 63 detects whether the gate lock lever 60 is unlocked or locked. For example, the lock state detecting sensor 63 is a voltage sensor (or current sensor) provided in an electric circuit connecting the gate lock valve 62 and the limit switch 61 and detects the locked state/unlocked state of the gate lock lever 60 by detecting the ON/OFF of the limit switch 61. The detection results are output to the controller 30. The lock state detecting sensor 63 may be configured to detect the locked state/unlocked state of the gate lock lever 60 by directly detecting the position of the lever.

Figure 4:
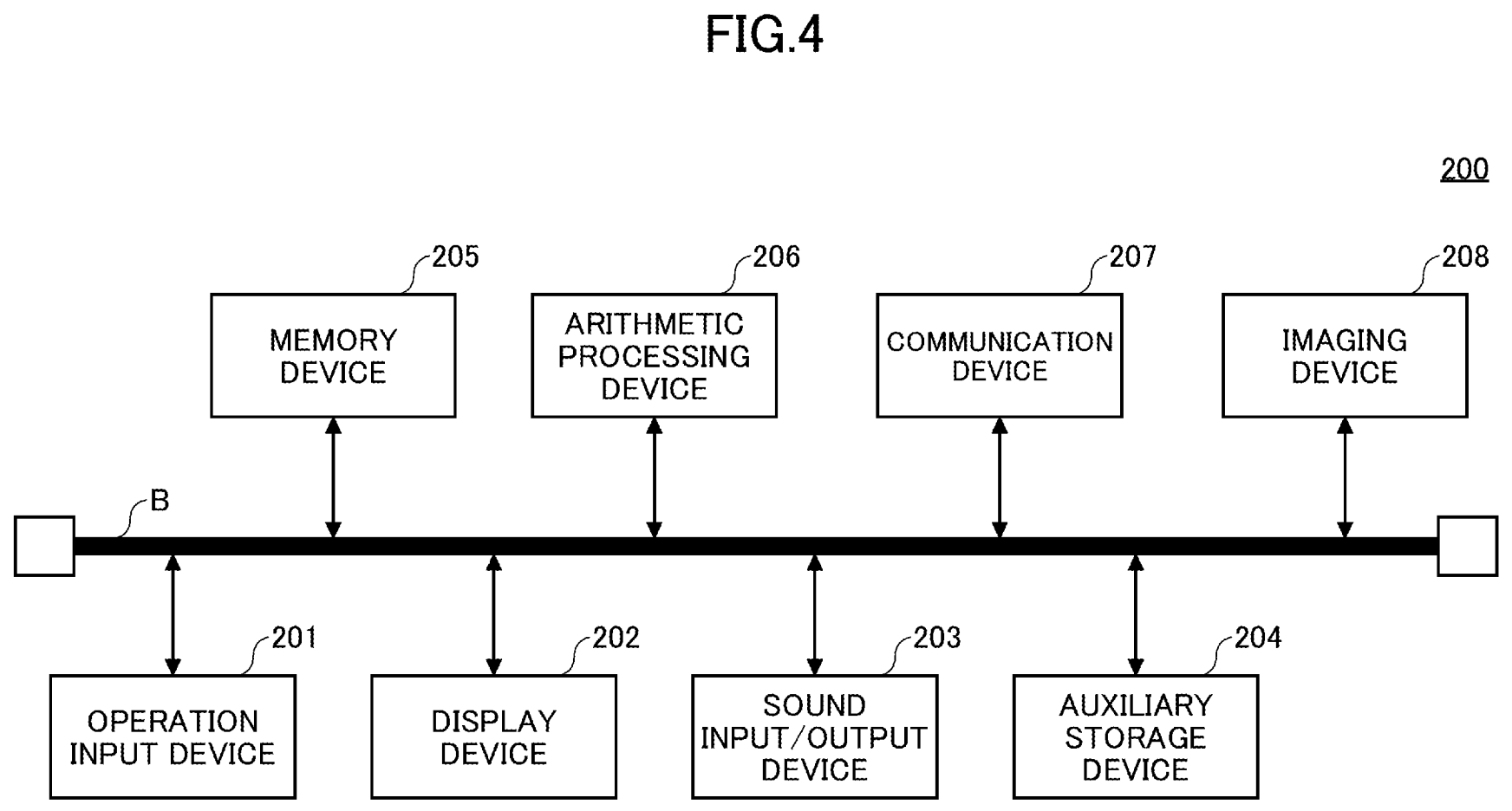

Next, the mobile terminal 200 according to the present embodiment will be described with reference to FIGS. 4 and 5. FIG. 4 is a diagram illustrating an example of a hardware configuration of the mobile terminal.

The mobile terminal 200 according to the present embodiment is a computer and includes an operation input device 201, a display device 202, a sound input/output device 203, an auxiliary storage device 204, a memory device 205, an arithmetic processing device 206, a communication device 207, and an imaging device 208, each of which is connected by a bus B or the like The operation input device 201 receives an operation input from a user. For example, the operation input device 201 receives operation inputs such as record a video, stop recording, playback, stop playback, store, transmission, and the like. In the present embodiment, as an example of the operation input device 201, a touch panel placed over a display panel of the display device 202 may be used.

The display device 202 displays various kinds of information. For example, a liquid crystal display, an organic EL display, or the like may be used as the display device 202. For example, the display device 202 displays a video of the excavator 100 captured by the imaging device 208, the state quantity information of the excavator 100 received by the communication device 207, and the like.

The sound input/output device 203 is implemented by, for example, a microphone and a speaker. The sound input/output device 203 outputs the sound to the outside. For example, when the video of the excavator 100 is played back, the sound input/output device 203 outputs a sound (i.e., an operation sound of the excavator 100) synchronized with the video.

The sound input/output device 203 inputs sound from an external source. For example, the sound input/output device 203 acquires a sound (i.e., an operation sound of the excavator 100) synchronized with the video while a video of the excavator 100 is being captured by the imaging device 208.

The auxiliary storage device 204 stores various programs (applications) installed in the mobile terminal 200 and stores various files, data, and the like necessary for the mobile terminal 200.

The memory device 205 reads and stores a program for implementing the functions of the mobile terminal 200 described below from the auxiliary storage device 204 at the time of activation of a program installed in the mobile terminal 200 or the like.

The arithmetic processing device 206 reads and executes a program stored in the memory device 205 to implement various processes as described below.

The communication device 207 is an example of a "transmitting part" and a "receiving part". The communication device 207 transmits and receives information between the mobile terminal 200 and an external device by a predetermined wireless communication method (for example, Wi-Fi, BlueTooth (registered trademark), or the like).

The imaging device 208 is a camera that captures an image. The imaging device 208 is mounted, for example, on the back side of the mobile terminal 200 so that the rear area of the mobile terminal 200 can be captured. The imaging device 208 can capture both a still image and a video. For example, the imaging device 208 is used to capture a video of the excavator 100.

Next, the functions of the mobile terminal 200 according to the present embodiment will be described with reference to FIG. 5. FIG. 5 is a diagram illustrating a function of a mobile terminal.

The mobile terminal 200 according to the present embodiment includes an input receiving part 210, a communication control part 220, a display control part 230, an imaging control part 240, a storing part 250, a playback part 260, and a storage part 270. The input receiving part 210, the communication control part 220, the display control part 230, the imaging control part 240, and the storing part 250 are implemented by reading and executing a program stored in the arithmetic processing device 206, the auxiliary storage device 204, the memory device 205, and the like. The function of the storage part 270 is implemented by a storage device such as the auxiliary storage device 204, the memory device 205, or the like.

The input receiving part 210 receives various inputs to the mobile terminal 200. Specifically, the input receiving part 210 receives an input of a request signal requesting the excavator 100 to acquire the operation data and an input of an operation instruction to the imaging device 208.

The communication control part 220 controls the communication device 207 and communicates with an external device in accordance with an input received by the input receiving part 210. Specifically, the communication control part 220 determines whether communication between the excavator 100 and the mobile terminal 200 is possible in accordance with the status of communication by the communication device 207.

The display control part 230 controls the display with respect to the display device 202. Specifically, the display control part 230 displays a screen corresponding to the operation instructions received by the input receiving part 210, on the display device 202.

The imaging control part 240 controls the imaging device 208 in accordance with an operation instruction received by the input receiving part 210. Specifically, the imaging control part 240 captures a video of the excavator 100 by the imaging device 208 and acquires the video data.

The storing part 250 stores the information received from the external device by the communication control part 220 in the storage part 270. Specifically, the storing part 250 associates the video data acquired by the imaging control part 240 with the operation data received by the communication control part 220 from the excavator 100, to form state record data 280 to be held in the storage part 270. That is, the storing part 250 stores data in which the state quantity information received from the excavator 100 is associated with the video data, in the storage part 270.

The playback part 260 plays back the state record data 280 stored in the storage part 270 and displays the data on the display device 202. The storage part 270 stores data in response to an instruction from the storing part 250.

Figure 6:
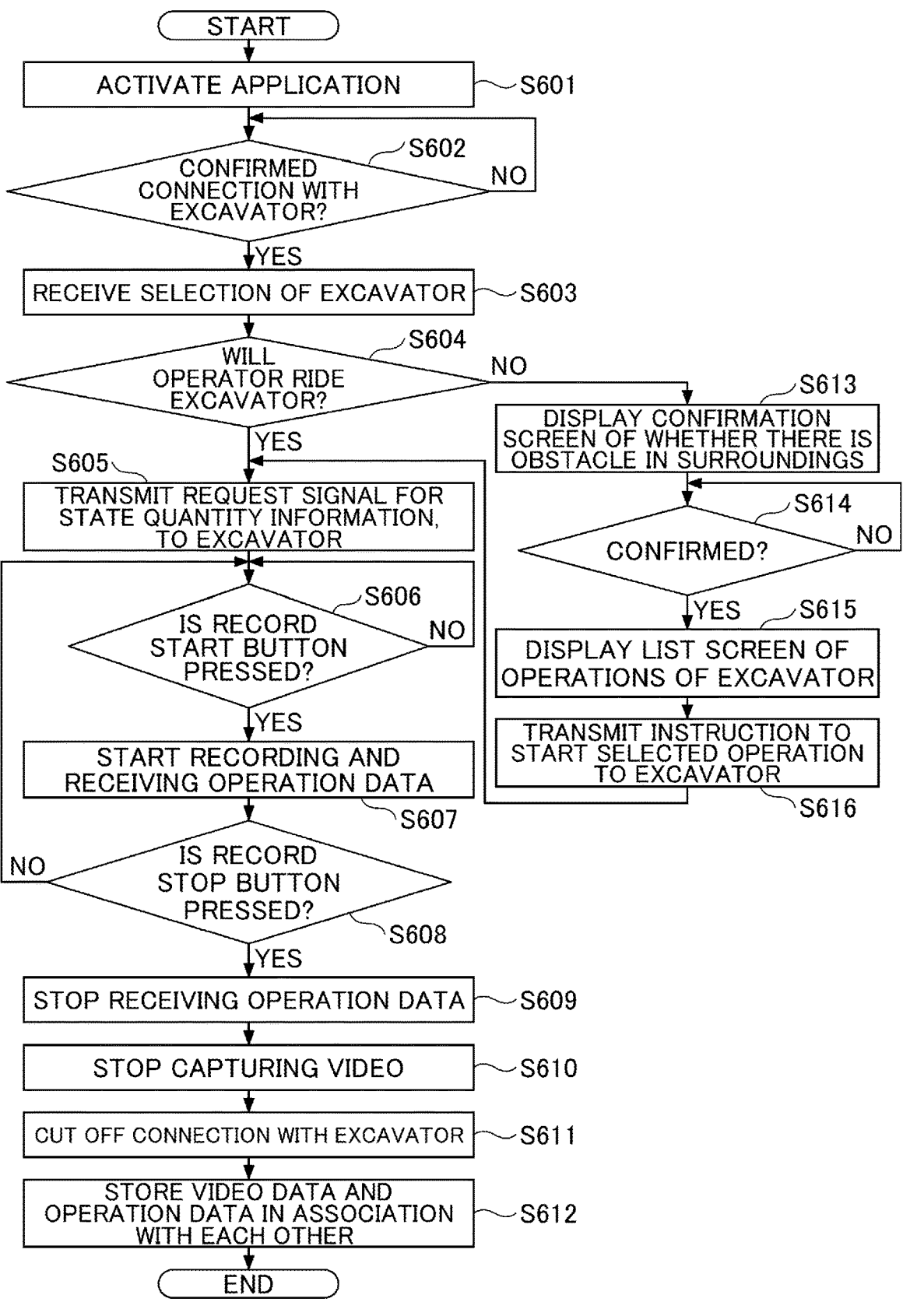
FIG. 6 is a first flowchart illustrating the process of a mobile terminal.

Next, the process of the mobile terminal 200 according to the present embodiment will be described with reference to FIG. 6. FIG. 6 is a first flowchart illustrating the process of a mobile terminal.

In step S601, the mobile terminal 200 according to the present embodiment activates a predetermined application when an operation instructing the activation of the predetermined application is received by the input receiving part 210. For example, the mobile terminal 200 activates a predetermined application in response to a predetermined icon on the home screen displayed on the display device 202 being selected by the user. The predetermined application is, for example, an application for implementing the functions of each part illustrated in FIG. 5.

Following step S601, in step S602, the mobile terminal 200 determines whether a connection with the excavator 100 is confirmed by the communication control part 220. That is, the communication control part 220 determines whether there is the excavator 100 capable of communicating with the communication device 207.

In step S602, when a connection with the excavator 100 is not confirmed, that is, when the excavator 100 capable of communication by using the communication device 207 is not present around the mobile terminal 200, the mobile terminal 200 waits until a connection is confirmed.

Note that in the excavator 100 for which connection to the mobile terminal 200 is not confirmed, the controller 30 is turned off. Further, at this time, if a connection is not confirmed for a predetermined period of time or more, the mobile terminal 200 may terminate the application.

In step S602, when the wireless communication connection with the excavator 100 is confirmed, the mobile terminal 200 causes a list of the excavators 100 for which wireless communication connection with the mobile terminal 200 is confirmed, to be displayed on the display device 202 by the display control part 230 and receives a selection of the excavator 100 with which communication is to be performed (step S603). The details of the list screen of the excavator 100 will be described below.

In the present embodiment, when the excavator 100 is selected, an item specification screen for specifying the item of the state quantity information to be displayed together with the video may be displayed on the imaging screen when the video of the selected excavator 100 is captured. When an item of the state quantity information is specified, the mobile terminal 200 may proceed to step S604. Details of the item specification screen are described later.

According to the present embodiment, the item specified in the item specification screen may be stored in the storage part 270 in association with the video data.

Subsequently, in step S604, the mobile terminal 200 determines whether an operator is to ride the selected excavator 100. Specifically, the mobile terminal 200 displays, by the display control part 230, a selection screen on the display device 202, which prompts a selection of causing the excavator 100 to operate according to operations by an operator, or causing the excavator 100 to operate in an unmanned state without the operator riding the excavator 100. Details of the selection screen are described below.

In the following description, the operation of the excavator 100 by operations by an operator may be referred to as a manned operation, and the operation of the excavator 100 without an operator riding the excavator 100 may be referred to as unmanned operation. Accordingly, in step S604, it is determined whether the operation of the excavator 100 is to be a manned operation or an unmanned operation.

In step S604, when the operator is not going to ride the excavator 100, that is, when the operation of the excavator 100 is an unmanned operation, the mobile terminal 200 proceeds to step S613, which will be described later.

In step S604, when an operator is going to ride the excavator 100, that is, when the operation of the excavator 100 is a manned operation, the mobile terminal 200 transmits a request signal requesting to acquire the operation data (the state quantity information) to the excavator 100 by the communication control part 220 (step S605).

Subsequently, in step S606, the mobile terminal 200 displays, by the communication control part 220, an imaging screen for capturing a video on the display device 202, and determines whether an operation instructing the start of the recording is received by the input receiving part 210. In step S606, when the corresponding operation is not received, the mobile terminal 200 waits until the corresponding operation is received.

In step S606, upon receipt of the corresponding operation, the mobile terminal 200 starts recording the video of the excavator 100 and starts receiving the operation data by the imaging control part 240 (step S607).

In the present embodiment, the mobile terminal 200 receives operation data including setting condition information from the excavator 100, but is not limited thereto. For example, the mobile terminal 200 may receive only the state quantity information from the excavator 100 among the operation data acquired by the acquiring part 31 of the excavator 100.

The excavator 100 continuously transmits the detection value as the state quantity information to the mobile terminal 200 at constant time intervals by a plurality of sensors. That is, the transmission control part 33 of the excavator 100 transmits the state quantity information including the detection value of a plurality of sensors to the mobile terminal 200 in real time.

The order of the processing of step S605 and step S606 may be reversed. That is, the mobile terminal 200 may receive an operation instructing the start of recording on the imaging screen and then transmit a request signal to the excavator 100.

The processing of steps 5605 to 5607 will be described in detail below. In the mobile terminal 200 according to the present embodiment, when the manned operation of the excavator 100 is selected, the communication control part 220 displays the imaging screen of the video on the display device 202.

When an operation to instruct recording of a video is received on the imaging screen of the video, the mobile terminal 200 may transmit a request signal to the excavator 100 by the display control part 230 and start capturing the video of the excavator 100.

That is, in the mobile terminal 200 according to the present embodiment, it is possible to acquire the video data representing the video of the excavator 100 and the state quantity information of the period synchronized with the capturing of the video of the excavator 100 by merely performing an operation of instructing the recording of the video, and thus the operation labor of the user of the mobile terminal 200 can be reduced.

The state quantity information may include the time slot of acquiring the state quantity information measured by a timekeeping function of the excavator 100. The video data may include an image capture time slot of capturing the video measured by the timekeeping function of the mobile terminal 200. The mobile terminal 200 according to the present embodiment may associate the operation data (state quantity information) with the video data based on the acquisition time slot included in the state quantity information and the image capture time slot included in the video data.

Subsequently, in step S608, the mobile terminal 200 determines whether an operation instructing to stop recording has been received on the imaging screen by the input receiving part 210. In step S608, when the corresponding operation is not received, the mobile terminal 200 returns to step S606.

When a corresponding operation is received in step S608, in step S609, the mobile terminal 200 stops receiving the operation data from the excavator 100 by the communication control part 220. Subsequently, in step S610, the mobile terminal 200 stops, by the imaging control part 240, the capturing of the video by the imaging device 208.

Subsequently, in step S611, the mobile terminal 200 cuts off the connection (communication) with the excavator 100 by the communication control part 220. Subsequently, in step S612, the mobile terminal 200 stores, by the storing part 250 in the storage part 270, the state record data 280 in which the operation data and the video data are associated with each other, and ends the process.

At this time, the storing part 250 may store the display item of the state quantity information specified in the item specification screen in the storage part 270 as a part of the state record data 280. The mobile terminal 200 may transmit the state record data 280 stored in the storage part 270 to an external management apparatus or the like.

When unmanned operation is selected in step S604, in step S613, the mobile terminal 200 displays, on the display device 202 by the display control part 230, a confirmation screen for prompting to confirm the presence or absence of an obstacle around the excavator 100. Note that the confirmation screen may display the detection result by the object detecting device S8 included in the excavator 100.

Subsequently, in step S614, the mobile terminal 200 determines whether an operation indicating that presence or absence of an obstacle has been confirmed has been received by the input receiving part 210. In step S614, if the corresponding operation is not received, the mobile terminal 200 waits until the corresponding operation is received.

In step S614, when a corresponding operation is received, the mobile terminal 200 displays a list screen indicating a list of the operations of the excavator 100 on the display device 202 by the display control part 230 (step S615). Details of the operation list screen are described below.

Subsequently, when an operation of selecting an operation is received by the input receiving part 210, the mobile terminal 200 transmits a start instruction of the selected operation to the excavator 100 by the communication control part 220 (step S616) and proceeds to step S605.

In the example of FIG. 6, when an operation instructing to stop recording is received in the imaging screen, the capturing of the video and the reception of the operation data by the imaging device 208 are stopped, but the present embodiment is not limited thereto.

The mobile terminal 200 according to the present embodiment may automatically stop recording and stop receiving the operation data when no operation is performed to instruct to stop recording even after a predetermined period of time elapses after the operation to instruct to start recording is received. According to the present embodiment, when this function is installed in the mobile terminal 200, acquisition of the state record data 280 that is not intended by the user can be prevented, for example, when recording is started due to an erroneous operation or when the user forgets to stop recording.

The mobile terminal 200 according to the present embodiment, for example, may stop recording and receiving operation data when the image of the excavator 100 is not included in the image captured by the imaging device 208. The case in which the image of the excavator 100 is not included in the captured image is the case in which the imaging device 208 is not facing the excavator 100, and a video that is unintended by the user may be recorded. In the present embodiment, it is possible to stop recording a video unintended by the user and to stop receiving operation data not corresponding to the video.

The mobile terminal 200 according to the present embodiment may stop recording when the wireless communication connection with the excavator 100 is interrupted. In the present embodiment, this function prevents a situation where only the video is recorded without acquiring the operation data synchronized with the video.

Figure 7:
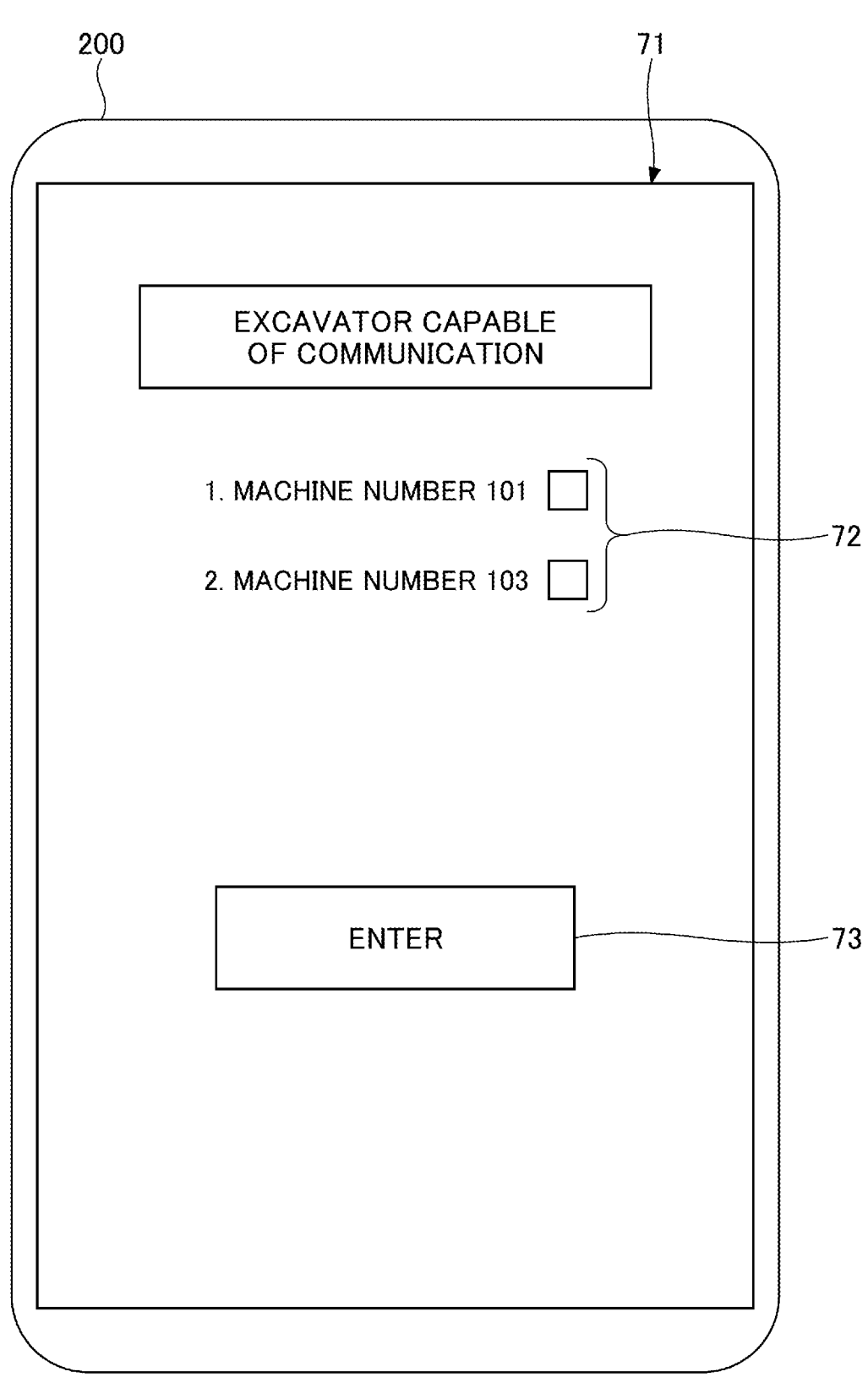
FIG. 7 is a diagram illustrating an example of the excavator list screen.

Hereinafter, a display example of the mobile terminal 200 will be described with reference to FIGS. 7 to 13. FIG. 7 is a diagram illustrating an example of the excavator list screen. A screen 71 illustrated in FIG. 7 is an example of the list screen of the excavator 100 displayed on the display device 202 in step S603 of FIG. 6.

The screen 71 includes a display area 72 in which a list of the excavators 100 for which connections with the mobile terminal 200 are confirmed, is displayed, and an operation button 73.

In the display area 72, the machine number of the excavator 100 for which a connection with the mobile terminal 200 has been confirmed, and a selection field associated with the machine number of the excavator 100, are displayed in association with each other.

In the mobile terminal 200 according to the present embodiment, when any of the selection fields displayed in the display area 72 is selected and the operation button 73 is operated, the excavator 100 identified by the machine number associated with the selection field is considered to be selected as the excavator 100 with which communication is to be performed. Then, the mobile terminal 200 causes the display of the display device 202 to transition from the screen 71 to the item specification screen for specifying the item of the state quantity information to be displayed on the imaging screen of the video.

Figure 8:
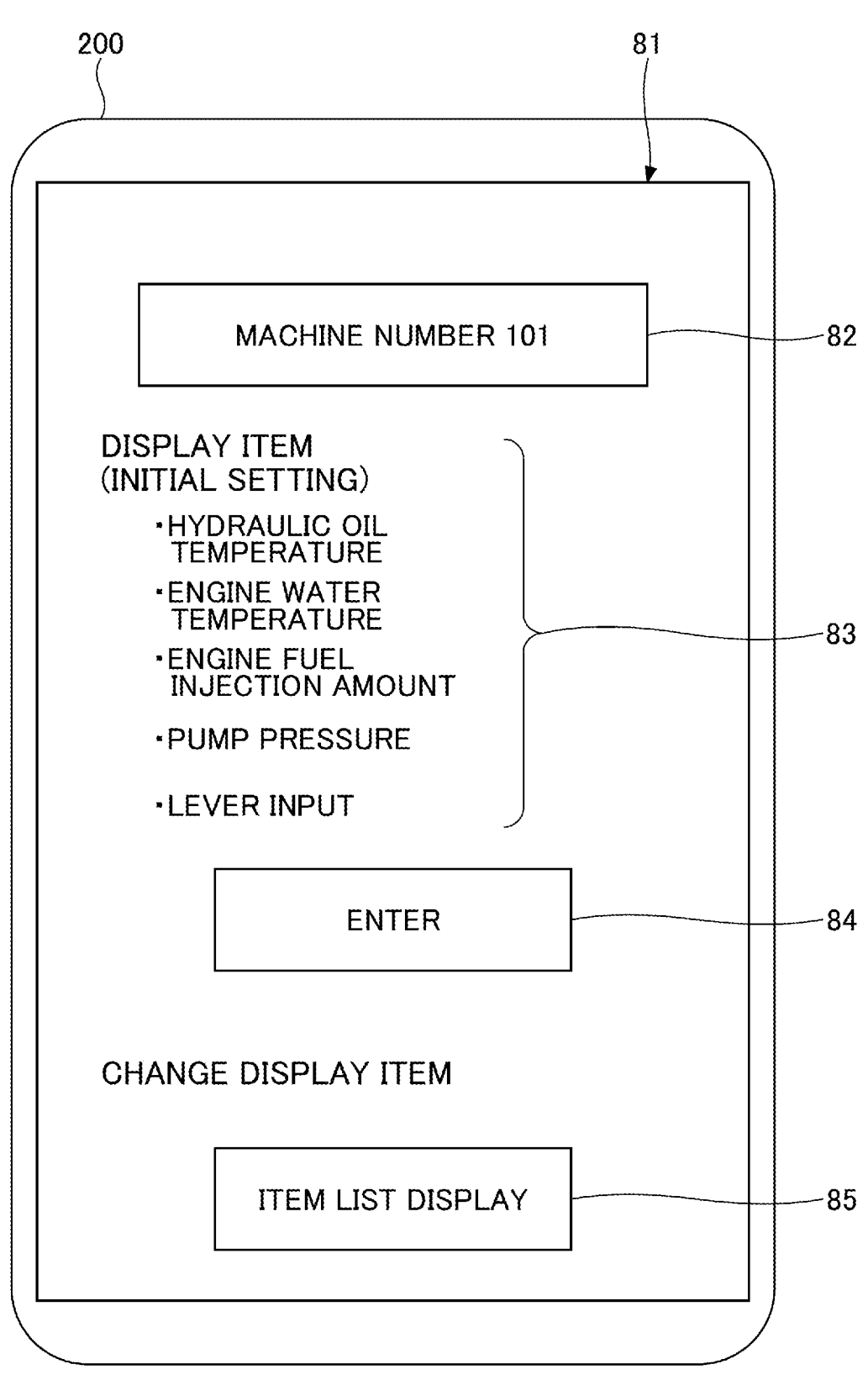
FIG. 8 is a diagram illustrating an example of the item specification screen for specifying the item of the state quantity information.

FIG. 8 is a diagram illustrating an example of an item specification screen for specifying an item of state quantity information. A screen 81 illustrated in FIG. 8 is displayed on the display device 202 after the excavator 100 is selected on the screen 71.

The screen 81 includes display areas 82 and 83 and operation buttons 84 and 85. The display area 82 displays the machine number of the excavator 100 performing wireless communication. The display area 83 displays a list of items of the state quantity information displayed when capturing the video of the excavator 100 identified from the machine number displayed on the display area 82. The items displayed in the display area 83 are a list of the items set as the default settings.

The operation button 84 is an operation button for setting an initial setting item displayed in the display area 83 as the item to be displayed on the imaging screen. When the operation button 84 is operated, for example, the mobile terminal 200 according to the present embodiment stores the item of the state quantity information displayed in the display area 83 as a part of the state record data 280, and causes the screen 81 to transition to the selection screen for selecting manned operation or unmanned operation.

The operation button 85 is an operation button for specifying items other than the items of the initial setting displayed in the display area 83. In the present embodiment, when the operation button 85 is operated, the screen 81 may be caused to transition to a list screen of items included in the state quantity information.

Figure 9:
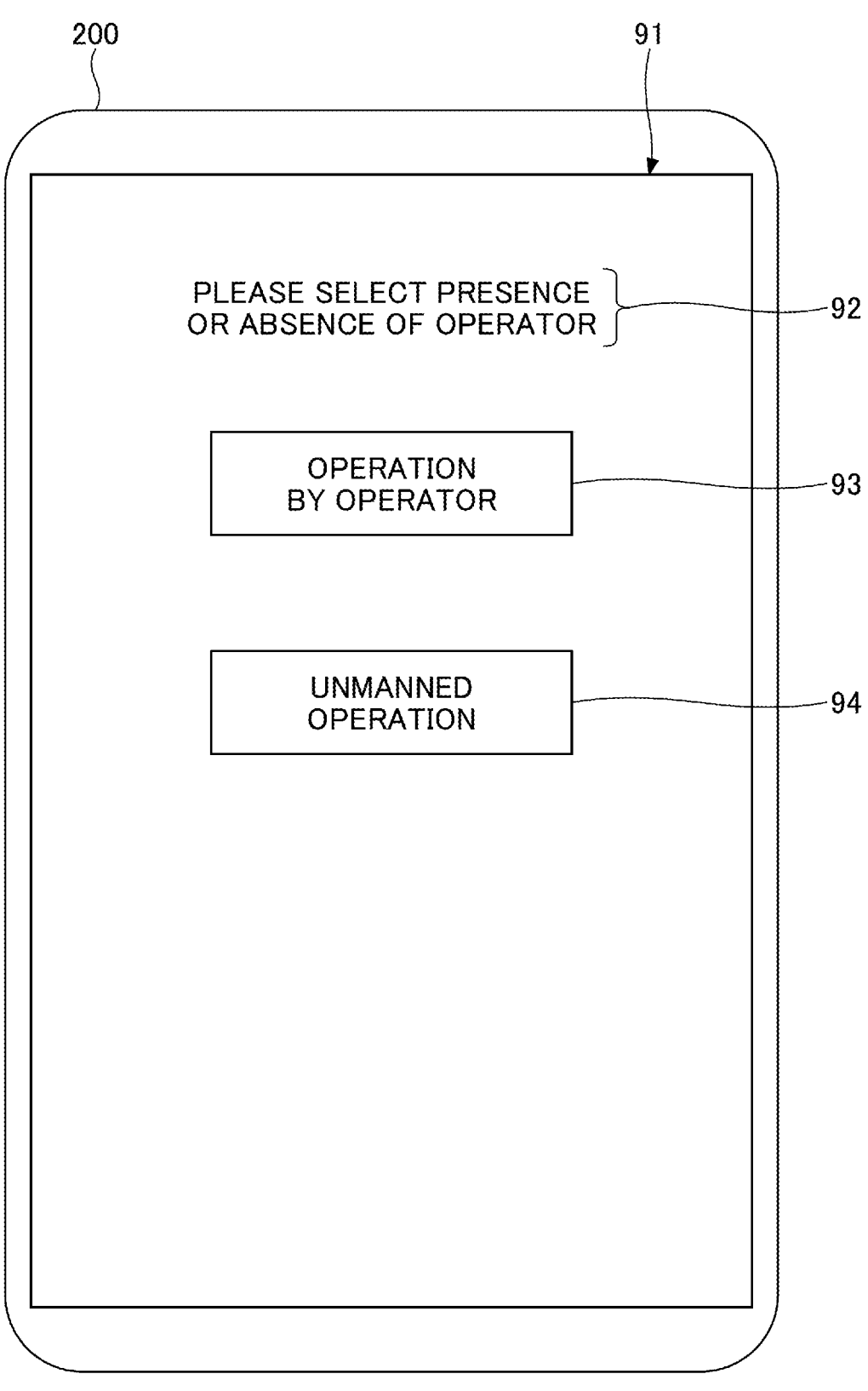
FIG. 9 is a diagram illustrating an example of a screen for selecting a manned operation or an unmanned operation.

FIG. 9 is a diagram illustrating an example of a selection screen for selecting manned operation or unmanned operation. A screen 91 illustrated in FIG. 9 is an example of the selection screen displayed in step S604 of FIG. 6.

The screen 91 includes a display area 92 and operation buttons 93 and 94. A message is displayed in the display area 92 to prompt confirmation as to whether an operator is to ride the excavator 100. That is, the display area 92 displays a message prompting the selection of either manned operation or unmanned operation.

The operation button 93 is an operation button for selecting a manned operation, and the operation button 94 is an operation button for selecting an unmanned operation. When the operation button 93 is operated, the mobile terminal 200 causes the screen 91 to transition to the imaging screen displayed in step S606. When the operation button 94 is operated, the mobile terminal 200 causes the screen 91 to transition to the confirmation screen displayed in step S613.

Figure 10:
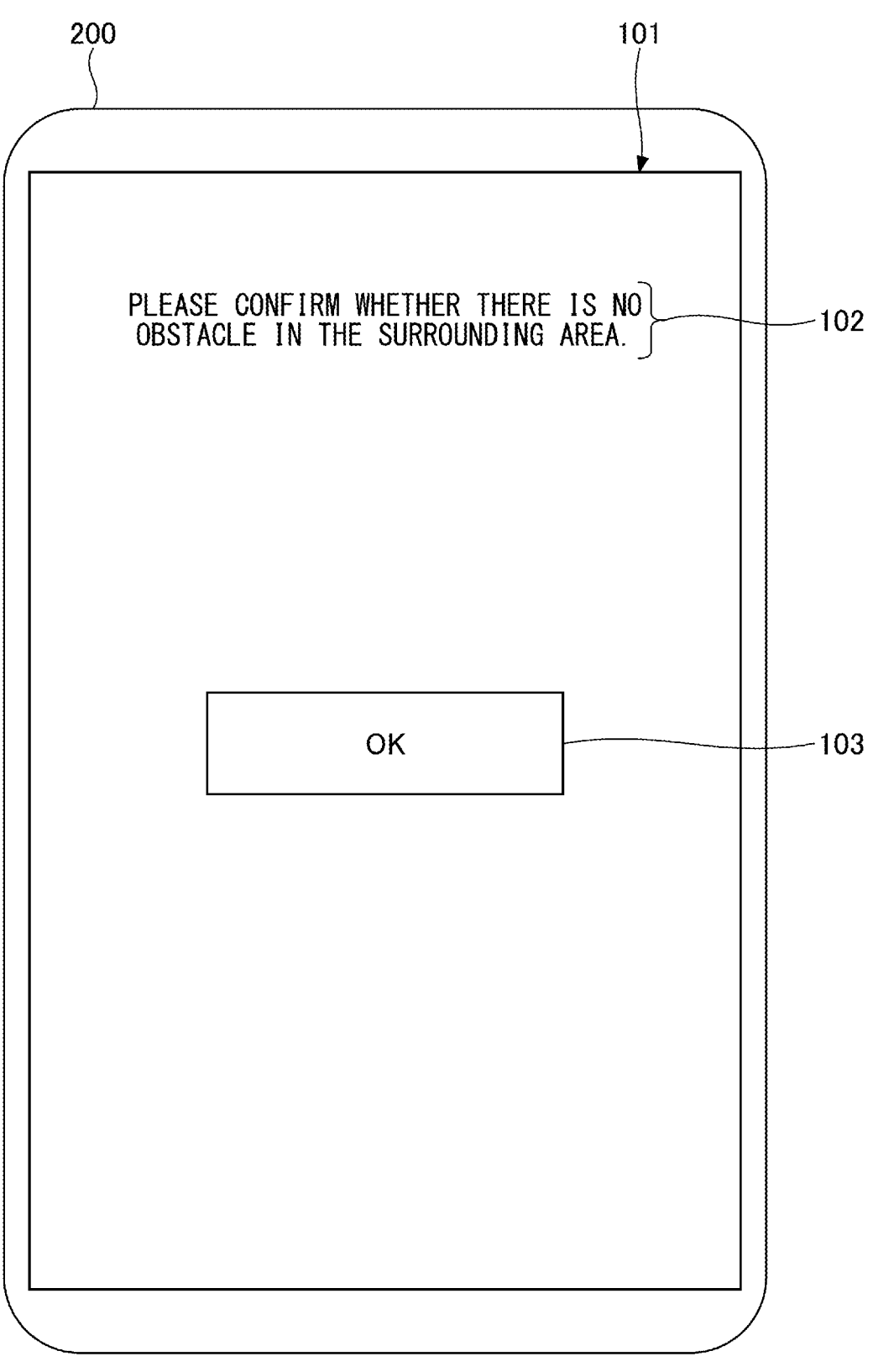
FIG. 10 is a diagram illustrating an example of a confirmation screen.

FIG. 10 is a diagram illustrating an example of a confirmation screen. A screen 101 illustrated in FIG. 10 includes a display area 102 and an operation button 103.

A message is displayed in the display area 102 to prompt a user of the mobile terminal 200 to confirm the presence or absence of an obstacle around the excavator 100. When an unmanned operation is selected, the mobile terminal 200 according to the present embodiment may transmit a request for acquiring the detection result obtained by the object detecting device S8 to the excavator 100 and display a message based on the detection result in the display area 102.

Specifically, for example, if the detection result indicates that an obstacle is detected around the excavator 100, the mobile terminal 200 may display a message indicating that fact in the display area 102.

When the operation button 103 is operated on the screen 101, the mobile terminal 200 causes the screen 101 to transition to the list screen of a list of the operations of the excavator 100 displayed in step S615 of FIG. 6.

Figure 11:
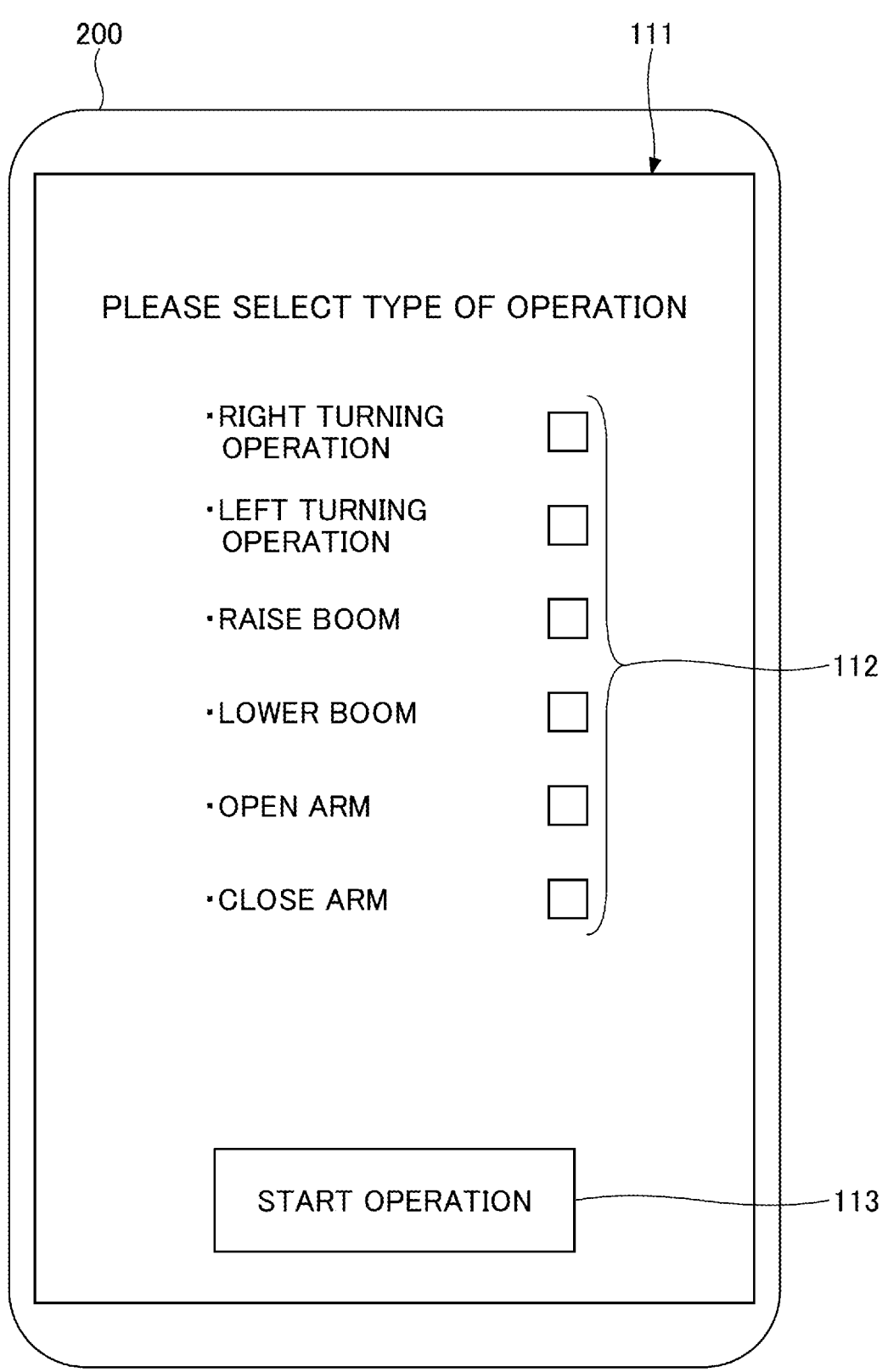
FIG. 11 is a diagram illustrating an example of a list screen of excavator operations.

FIG. 11 is a diagram illustrating an example of a list screen of the operation of an excavator. A screen 111 illustrated in FIG. 11 is an example of a list screen of a list of the operations of the excavator 100 in the unmanned operation.

The screen 111 includes a display area 112 and an operation button 113. In the display area 112, a prescribed operation name and a selection field associated with each of the prescribed operation names are displayed as a list of the operations performed by the excavator 100.

The prescribed operation is an operation of moving from a first prescribed posture determined in advance to a second prescribed posture determined in advance. Accordingly, the prescribed operation starts at the first prescribed posture and ends at the second prescribed posture. The first and second postures may be different or may be the same. That is, the prescribed operation may be an operation to change the posture from a certain prescribed posture to another prescribed posture, or an operation to perform a predetermined operation from a certain prescribed posture and then return to the same certain prescribed posture.

The operation button 113 is an operation button for transmitting the start instruction of the selected prescribed operation to the excavator 100.

When a selection field is selected in the display area 112 and the operation button 113 is operated, the mobile terminal 200 transmits a start instruction of a prescribed operation corresponding to the selected selection field to the excavator 100 and causes the screen 111 to transition to an imaging screen of the video displayed in step S606.

Figure 12:
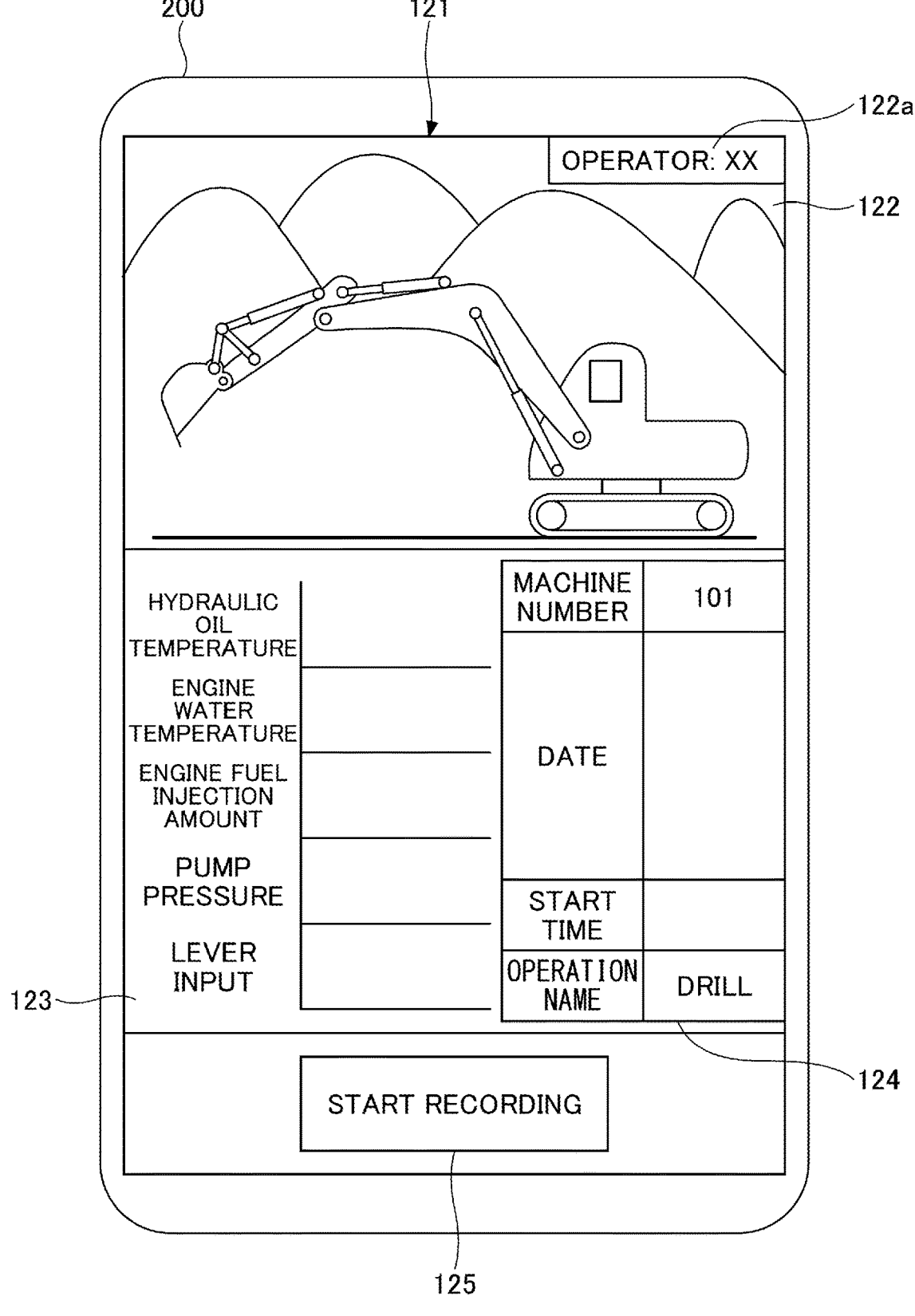
FIG. 12 is a first diagram illustrating an example of an imaging screen of a video.

FIG. 12 is a first diagram illustrating an example of an imaging screen of a video. A screen 121 illustrated in FIG. 12 is an example of an imaging screen displayed on the display device 202 after a wireless communication connection with the excavator 100 is established.

The screen 121 includes display areas 122, 123, and 124 and an operation button 125. The display area 122 displays the image being captured by the imaging device 208 of the mobile terminal 200. The display area 122 includes a display area 122a. The display area 122a may display information identifying the operator of the excavator 100 when a manned operation is selected as the operation of the excavator 100. Further, information representing unmanned operation may be displayed in the display area 122a when unmanned operation is selected as the operation of the excavator 100.

In the display area 123, among the state quantity information received from the excavator 100, the item specified in the item specification screen is displayed. In the example of FIG. 12, the display area 123 displays the initially set items.

Specifically, in the display area 123, the hydraulic oil temperature, the engine water temperature, the engine fuel injection amount, the pump pressure (discharge pressure of the main pump 14), and the lever input (operation pressure of each operation lever) are displayed as items of the state quantity information.

In the present embodiment, the information representing the item displayed in the display area 123 is set as a part of the state record data 280 as the display item information. Note that the items displayed in the display area 123 are part of multiple items included in the state quantity information. Further, in the display area 123, instead of the item "engine fuel injection amount", an item "common rail pressure (engine fuel injection pressure)" included in the state quantity information may be displayed.

In the example of FIG. 12, the reception of the state quantity information has not started, and, therefore, the waveform representing the value of the item of the state quantity information displayed in the display area 123, is not displayed.

The display area 124 displays information that is the bibliographic items for identifying the video data. Specifically, the display area 124 displays the machine number of the excavator 100 with which the wireless communication connection is established, the date when the request signal for the operation data is transmitted, the time when recording of the captured video is started, the operation name of the excavator 100, and the like.

In the example of FIG. 12, the date and start time are blank because this is before the start of the recording of the video. However, the current date and time may be displayed as the date and start time.

The operation name of the excavator 100 displayed on the display area 124 may be input by an operator of the excavator 100. Further, the operation name of the excavator 100 may be selected from preset such as drilling, leveling, turning, boom raising, and the like, for example, by operating the operation input field. The operation input field may be, for example, a list of the operations of the excavator 100 displayed on the display area 112 illustrated in FIG. 11.

Further, the operation name of the excavator 100 may not be input to an operator, but may instead be an operation name identified by the controller 30 of the excavator 100 based on the detection value of the posture sensor or the like as the state quantity information. In this case, the excavator 100 may identify the type of operation of the own machine and transmit the operation name which is the result of the identification to the mobile terminal 200.

Further, the operation name of the excavator 100 may be identified based on the video data captured at the mobile terminal 200.

Further, the item of information displayed in the display area 124 is not limited to the example illustrated in FIG. 12. Further, items to be displayed in the display area 124 may be set. Further, it may be possible to switch between the display and non-display of the display area 124 on the screen 121.

Further, in the present embodiment, some of the items of the setting condition information of the excavator 100 included in the operation data may be displayed on the screen 121. In this case, the item of the setting condition information displayed on the screen 121 may be an item predetermined as the initial setting or an item specified by the user of the mobile terminal 200.

In the following description, the information displayed in the display area 124 may be expressed as bibliographic information of the video data. Bibliographic information of the video data is retained together with the video data and the state quantity information as part of the state record data 280.

The operation button 125 is an operation button for instructing to start recording a video. When the operation button 125 is operated on the screen 121, the mobile terminal 200 starts recording a video of the image displayed in the display area 122.

Figure 13:
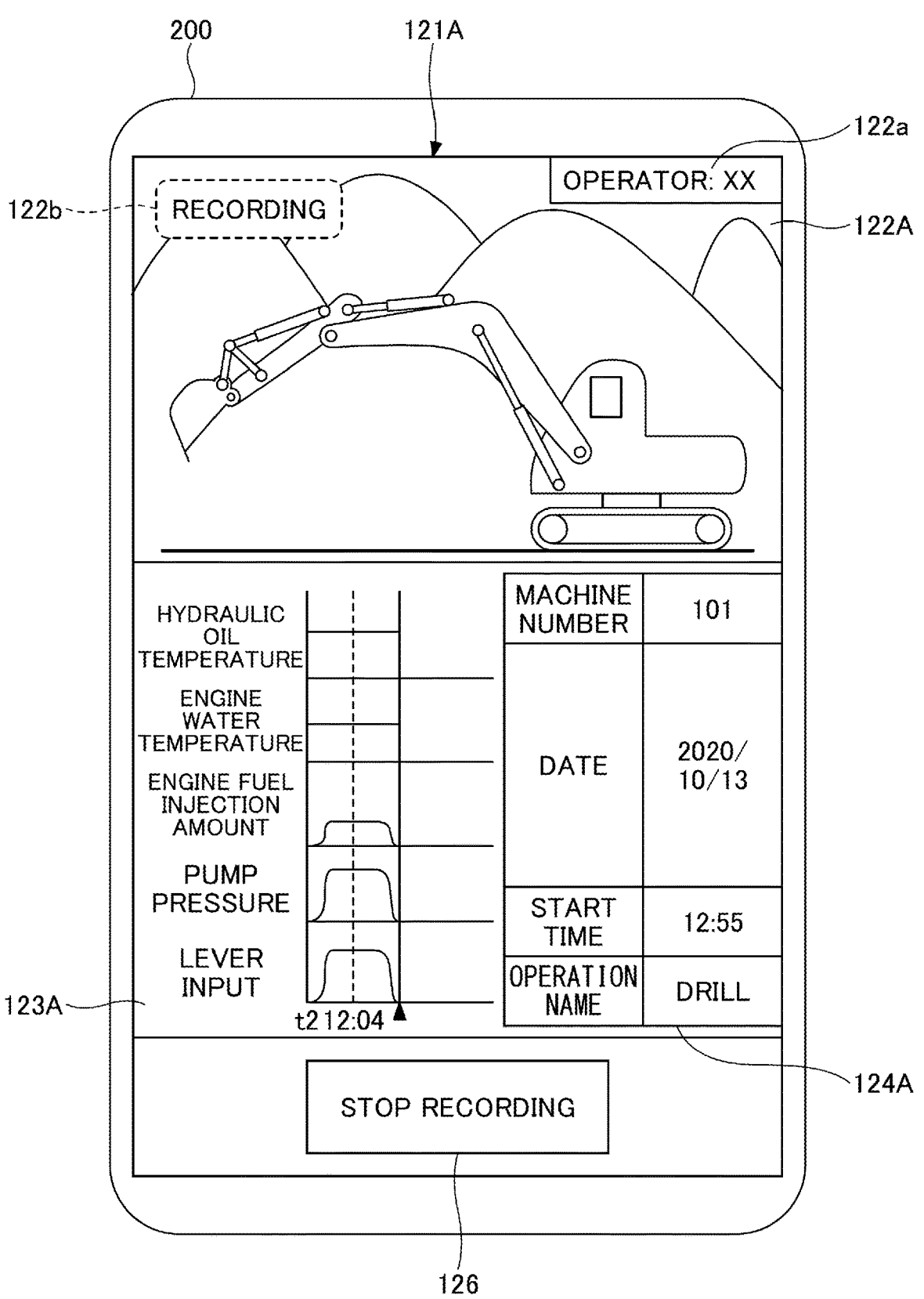
FIG. 13 is a second diagram illustrating an example of an imaging screen of a video.

FIG. 13 is a second diagram illustrating an example of an imaging screen of a video. A screen 121A illustrated in FIG. 13 is an example of a recording screen while recording a video.

The screen 121A includes display areas 122A, 123A, and 124A, and an operation button 126. The display area 122A includes a display area 122a and a display area 122b. The display area 122b displays information indicating that a video is currently being recorded as displayed in the display area 122A.

In the display area 123A, the operation data including the state quantity information is received upon the start of recording the video, and, therefore, a waveform representing the value of an item is displayed for each item of the state quantity information. In display area 124A, the date when the recording started and the start time are displayed.

The operation button 126 is an operation button for instructing to stop the recording of the video. When the operation button 126 is operated on the screen 121A, the mobile terminal 200 according to the present embodiment stops recording the video and stores the state record data 280 in the storage part 270.

Further, the mobile terminal 200 according to the present embodiment may display an input screen of a memo concerning the state at the time of image capturing after the operation button 126 is operated on the screen 121A. In this case, when a memo is input to the input screen, the mobile terminal 200 stores the memo information representing the content of the input memo in the storage part 270 as a part of the state record data 280.

Thus, the state record data 280 according to the present embodiment includes video data including sound data, operation data (including state quantity information and setting condition information), bibliographic information of the video data, display item information representing items of the state quantity information displayed in the display area 123 at the time of recording, and memo information. The state record data 280 may not include all of these pieces of information. The state record data 280 will suffice as long as at least the video data including sound data and the state quantity information are included.

Figure 14:
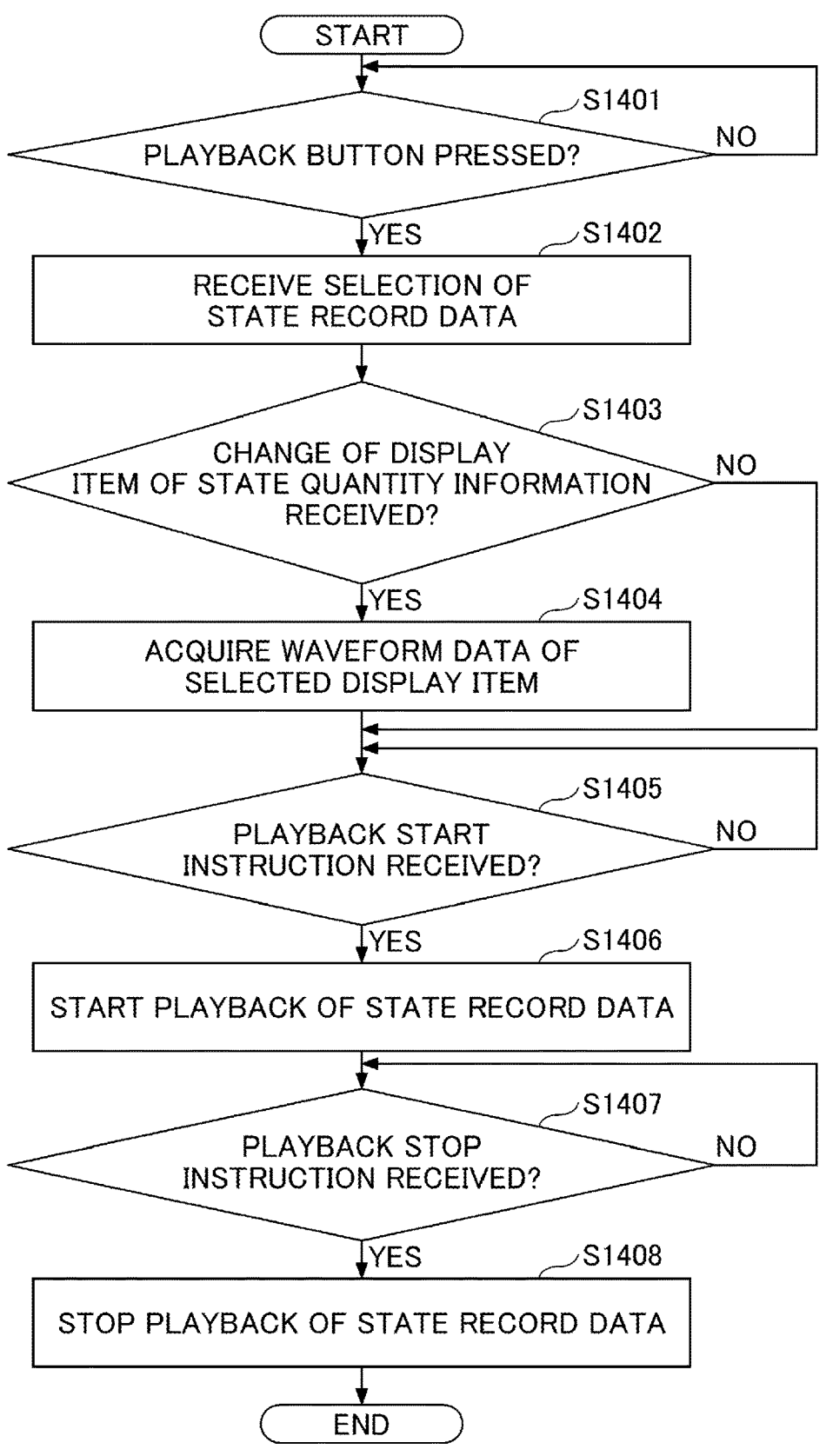
FIG. 14 is a second flowchart illustrating the process of a mobile terminal.

As described above, the process of acquiring the state record data 280 by the mobile terminal 200 is performed. Next, a process of playing back the state record data 280 by the mobile terminal 200 will be described with reference to FIG. 14. FIG. 14 is a second flowchart illustrating a process of a mobile terminal.

In the present embodiment, when the process of acquiring the state record data 280 is completed, the predetermined application may be terminated once. In this case, when playing back the state record data 280, the mobile terminal 200 activates the predetermined application again and displays a playback screen of the state record data 280 stored in the storage part 270 on the display device 202.

In step S1401, the mobile terminal 200 determines whether an operation instructing the playback of the state record data 280 is received in the playback screen. In step S1401, when the corresponding operation is not received, the mobile terminal 200 waits until the corresponding operation is received.

In step S1401, when the corresponding operation is received, the mobile terminal 200 receives a selection of the state record data 280 to be played back (step S1402).

Subsequently, in step S1403, the mobile terminal 200 determines whether a change of the display item of the state quantity information to be displayed when the state record data 280 is played back has been received. Specifically, the mobile terminal 200 determines whether an operation instructing a change of the display item of the state quantity information included in the selected state record data 280 has been received.

In step S1403, when the change of the display item is not received, the mobile terminal 200 proceeds to step S1405, which will be described later.

When the change of the display item is received in step S1403, in step S1404, the mobile terminal 200 acquires the waveform data that is the value of the item selected to be the display item displayed after the change, from the state quantity information included in the state record data 280.

Subsequently, in step S1405, the mobile terminal 200 determines whether an operation instructing the start of the playback of the state record data 280 has been received. In step S1405, when the corresponding operation is not received, the mobile terminal 200 waits until the corresponding operation is received.

In step S1405, when the corresponding operation is received, the mobile terminal 200 reads, by the playback part 260, the state record data 280 stored in the storage part 270, and starts the playback (step S1406).

That is, the mobile terminal 200 reads the state record data 280 and displays the state record data 280 on a playback screen displayed on the display device 202.

Subsequently, in step S1407, the mobile terminal 200 determines whether an operation instructing to stop the playback has been received.

In step S1407, when the corresponding operation is not received, the mobile terminal 200 waits until the corresponding operation is received.

In step S1407, upon receipt of the corresponding operation, the mobile terminal 200 stops the playback of the state record data 280 (step S1408) and ends the process.

Hereinafter, a display example of the mobile terminal 200 at the time of playback of the state record data 280 will be described with reference to FIGS. 15 and 16.

Figure 15:
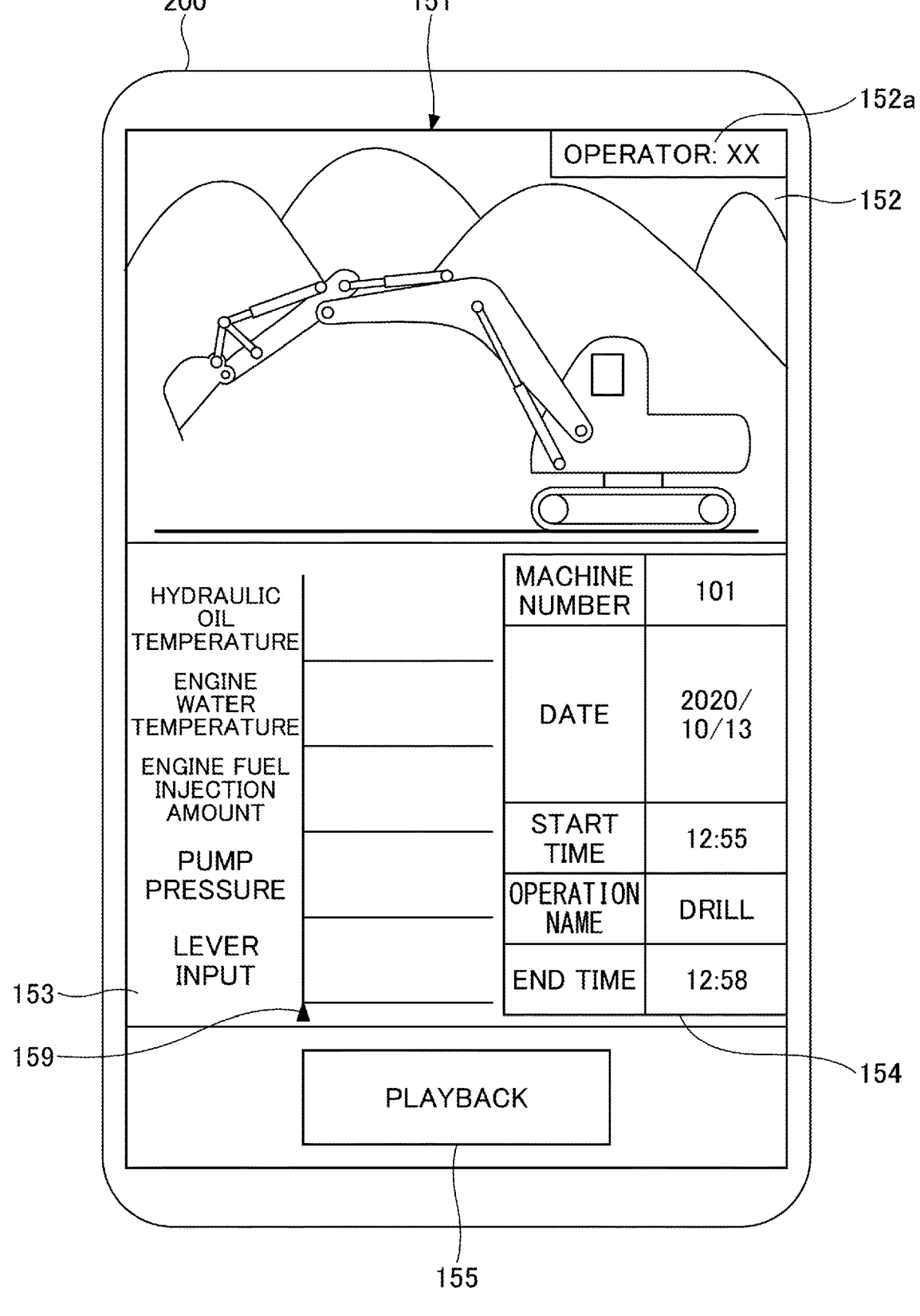
FIG. 15 is a first diagram illustrating an example of a playback screen.

FIG. 15 is a first diagram illustrating an example of a playback screen. A screen 151 illustrated in FIG. 15 is an example of the playback screen displayed on the display device 202 in step S1401 of FIG. 14.

The screen 151 includes display areas 152, 153, and 154 and an operation button 155. The display area 152 displays the video data included in the state record data 280. In the example of FIG. 15, the state record data 280 has been selected, and illustrates a state before playback is started.

Accordingly, the first frame (still image) of the video data included in the selected state record data 280 is displayed in the display area 152. Further, the state record data 280 is acquired at a work site of the excavator 100, and, therefore, a view of the work site of the excavator 100 is also captured together with the excavator 100. In the example of FIG. 15, it can be seen that the work site of the excavator 100 is in a mountain region.

The display area 152 includes a display area 152a. Part of the bibliographic information included in the state record data 280 is displayed in the display area 152a. In the example of FIG. 15, as part of the bibliographic information, information indicating an operator of the excavator 100 when the video is captured is displayed in the display area 152a.

In the display area 153, items of the state quantity information indicated by the display item information included in the state record data 280 are displayed. In the example of FIG. 15, this is before the playback of the state record data 280, and, therefore, the waveform representing the value of each item displayed in the display area 153 is not displayed. Further, because this is before the playback, a timing display bar 159 representing the playback time of the video data is displayed at the position that is the start point of the waveform.

Further, when the mobile terminal 200 according to the present embodiment receives an operation of selecting an item displayed in the display area 153, it is considered that an instruction for changing the item of the state quantity information is received. Specifically, it is considered that the mobile terminal 200 has received an instruction to change the selected item to another item.

Upon receiving an instruction to change the item, the mobile terminal 200 displays a list of the items of information included in the state quantity information by a pull-down method or the like at a position where the selected item is displayed.

When the mobile terminal 200 receives a selection of an item from the list, the mobile terminal 200 may display the item selected from the list in the display area 153 instead of the item instructed to be changed. Further, the mobile terminal 200 may add an item selected from the list to be newly displayed in the display area 153.

When the mobile terminal 200 receives a change of an item, the mobile terminal 200 extracts waveform data corresponding to this item from the state quantity information.

The display area 154 displays the bibliographic information included in state record data 280. In the example of FIG. 15, in addition to the machine number, the date, the start time of recording, and the operation name, the end time when the recording of the video data is ended is displayed.

The operation button 155 is an operation button for instructing the playback of the state record data 280. When the operation button 155 is operated on the screen 151, the mobile terminal 200 starts playing back the state record data 280.

Figure 16:
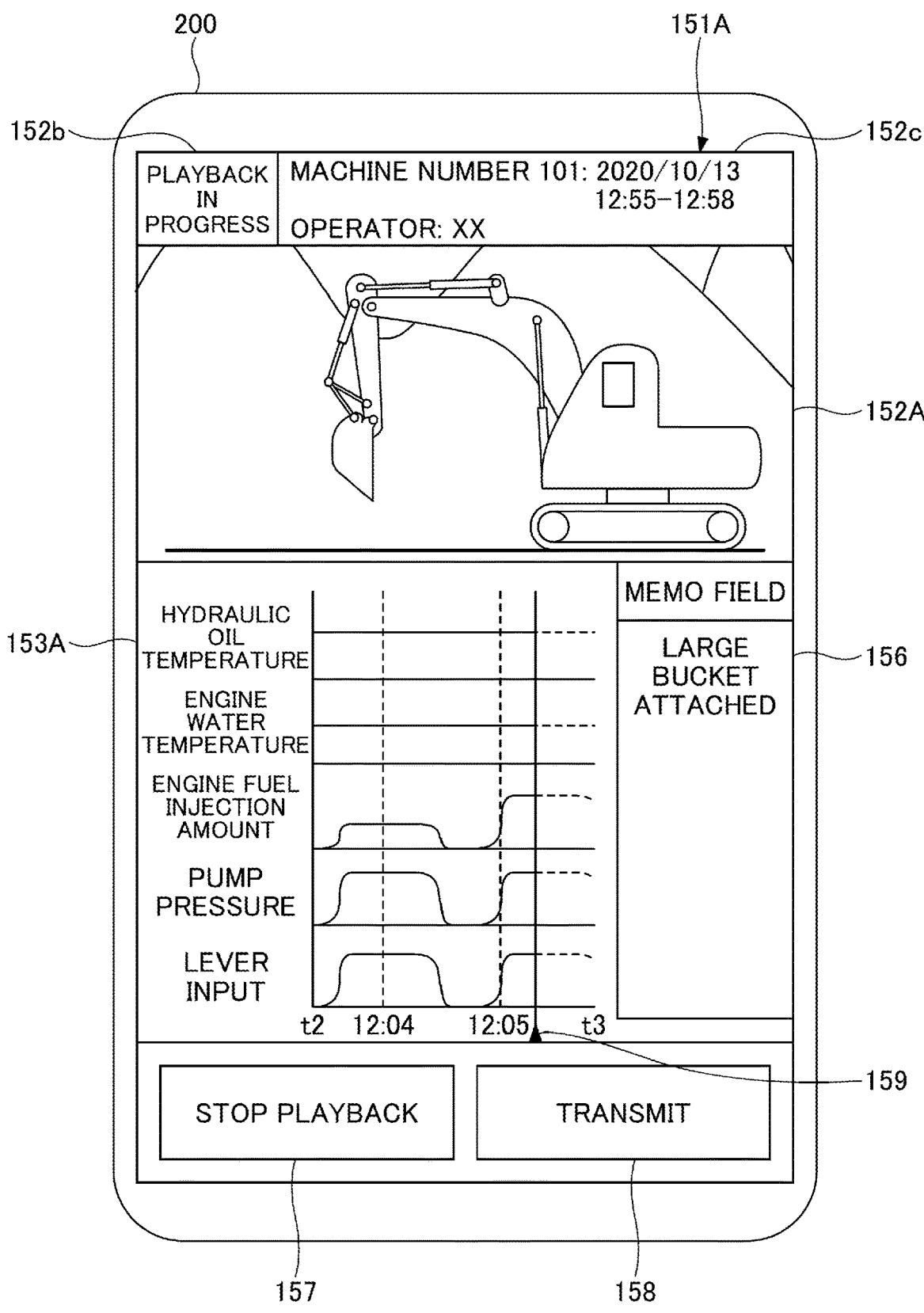
FIG. 16 is a second diagram illustrating an example of a playback screen.

FIG. 16 is a second diagram illustrating an example of a playback screen. A screen 151A illustrated in FIG. 16 is an example of the playback screen displayed on the display device 202 in step S1406 of FIG. 14.

The screen 151A includes display areas 152A, 153A, and 156 and operation buttons 157 and 158.

The display area 152A displays the video data being played back. The display area 152A includes display areas 152b and 152c. In the display area 152b, information indicating that the video data included in the state record data 280 is being played back, is displayed. The display area 152c displays the bibliographic information of the video data being played back. A part of the bibliographic information of the video data may be displayed in the display area 152c.

The mobile terminal 200 according to the present embodiment outputs the sound data included in the video data from the sound input/output device 203.

A waveform representing the value of the displayed item among the state quantity information included in the state record data 280 is displayed in the display area 153A. In the display area 153A, the timing display bar 159 is displayed at a position indicating the playback time, and the waveform is displayed along with the movement of the timing display bar 159. The waveform data representing this waveform is data acquired in synchronization with the video data being played back.

The display area 156 displays the memo information or the like input at the time of capturing the video data. In the example of FIG. 16, it can be seen that a large bucket was attached to the excavator 100 at the time when the video being played back was recorded.

The operation button 157 is an operation button for stopping the playback of the state record data 280. The operation button 158 is an operation button for transmitting the state record data 280 to an external management apparatus or the like.

When the operation button 157 is operated on the screen 151A, the mobile terminal 200 stops the playback of the state record data 280. When the operation button 158 is operated on the screen 151A, the mobile terminal 200 transmits the state record data 280 that is being played back or that has stopped being played back, to a management apparatus or the like. The mobile terminal 200 may erase the state record data 280 held in the storage part 270 after the state record data 280 is transmitted to the management apparatus or the like.

Figure 17:
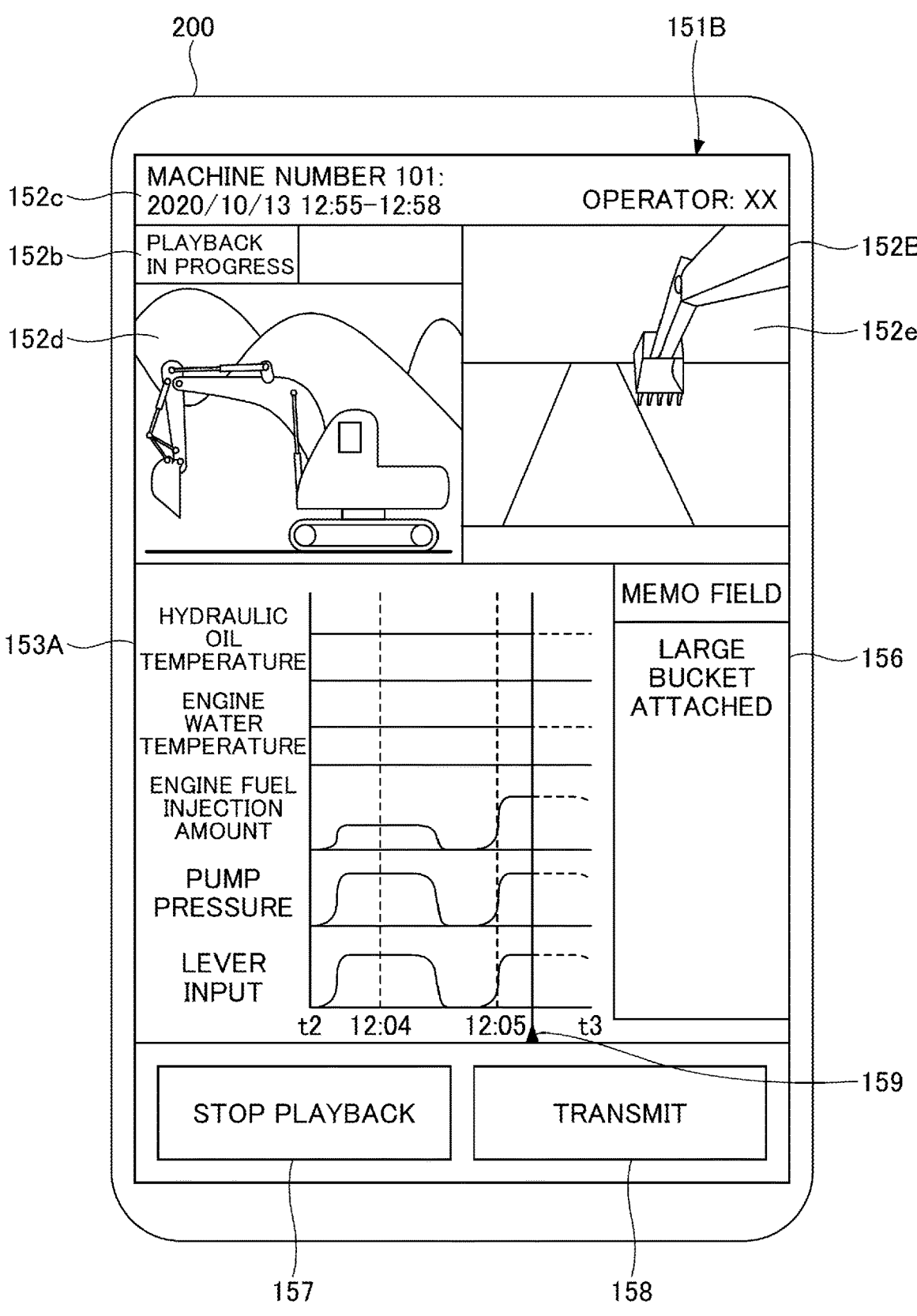
FIG. 17 is a third diagram illustrating an example of a playback screen.

Next, another example of a playback screen displayed on the mobile terminal 200 will be described with reference to FIG. 17. FIG. 17 is a third diagram illustrating an example of a playback screen. A screen 151B illustrated in FIG. 17 is a modification of the screen 151A illustrated in FIG. 16.

The screen 151B differs from the screen 151A illustrated in FIG. 15 in that a video captured by the mobile terminal 200 and a video captured by the camera S6 of the excavator 100 among the state quantity information included in the state record data 280, are displayed in the display area 152B.

The display area 152B includes display areas 152b, 152c, 152d, and 152e, and information indicating that the video data is being played back is displayed in the display area 152b. The display area 152c displays the bibliographic information included in the state record data 280.

In the display area 152d, the video data included in the state record data 280 is displayed. That is, the display area 152d displays the video data captured by the imaging device 208 of the mobile terminal 200.

The display area 152e displays the video data captured by the camera S6 of the excavator 100 among the state quantity information included in the state record data 280. More specifically, among the cameras S6 included in the excavator 100, a video captured by the camera that captures the area in front of the excavator 100 is displayed in the display area 152e.

As described above, the video of the excavator 100 captured by the mobile terminal 200 and the video captured by the camera S6 of the excavator 100 are displayed simultaneously on the screen 151B. Therefore, the user of the mobile terminal 200 can easily identify the overall movement of the excavator 100.

As described above, according to the present embodiment, the video during the operation of the excavator 100 and the state quantity information acquired in synchronization with the video data (including the sound data) representing video can be simultaneously viewed by the user of the mobile terminal 200.

Further, according to the present embodiment, the state record data 280 is recorded and stored, and, therefore, the operation of the excavator 100 can be identified by a viewer of the state record data 280, even at a place other than the work site where the excavator 100 is performing work. Further, according to the present embodiment, the work site of the excavator 100 is captured together with the excavator 100 as a video in the video data, and, therefore, the user of the mobile terminal 200 can identify the work environment of the excavator 100.

Further, according to the present embodiment, when the video data is played back, the sound data is also played back, so that the user of the mobile terminal 200 can listen to the operation sound of the excavator 100.

For this reason, the user of the mobile terminal 200 can view the state record data 280 to confirm matters that cannot be determined only from the waveform of the state quantity information. Specifically, matters that cannot be determined only from the waveform of the state quantity information are: whether the operation of the excavator 100 inferred from the waveform of the state quantity information is consistent with the actual operation of the excavator 100, whether the operation speed of the excavator 100 is different from that of normal circumstances, the color of the smoke discharged from the excavator 100, whether abnormal noise is generated during operation, whether the machine body is suitable for the environment of the work site, and the like.

Accordingly, according to the present embodiment, the user of the mobile terminal 200 can confirm, with the mobile terminal 200, the state record data 280 of the excavator 100 that is currently being implemented at a work site even before an abnormality occurs in the excavator 100, and identify in detail how to operate and use the excavator 100. Accordingly, the user of the mobile terminal 200 can make an evaluation in which a comparison is made against the work environment.

The mobile terminal 200 may be carried by each of a plurality of users (e.g., the operator, a service person, a technician, etc.). In this case, each of a plurality of users can confirm the state record data 280 of the excavator 100 with his or her own mobile terminal 200 at a work site.

Further, in the above-described embodiment, the video captured by the mobile terminal 200 is a video in which the entire excavator 100 is captured from the surroundings of the excavator 100, but is not limited thereto. The video captured by the mobile terminal 200 may be, for example, a video captured by the mobile terminal 200 located within the cabin 10 of the excavator 100. In this case, the captured video may be a video capturing the interior of the cabin 10 or a video capturing the exterior of the cabin 10.

The mobile terminal 200 according to the present embodiment may be, for example, a wearable terminal. Specifically, the mobile terminal 200 may be an eyeglass-type mobile terminal or a wristwatch-type mobile terminal. The mobile terminal 200 is portable and may be any form of terminal capable of capturing a video and communicating with the excavator 100.

Other Embodiments

Figure 18:
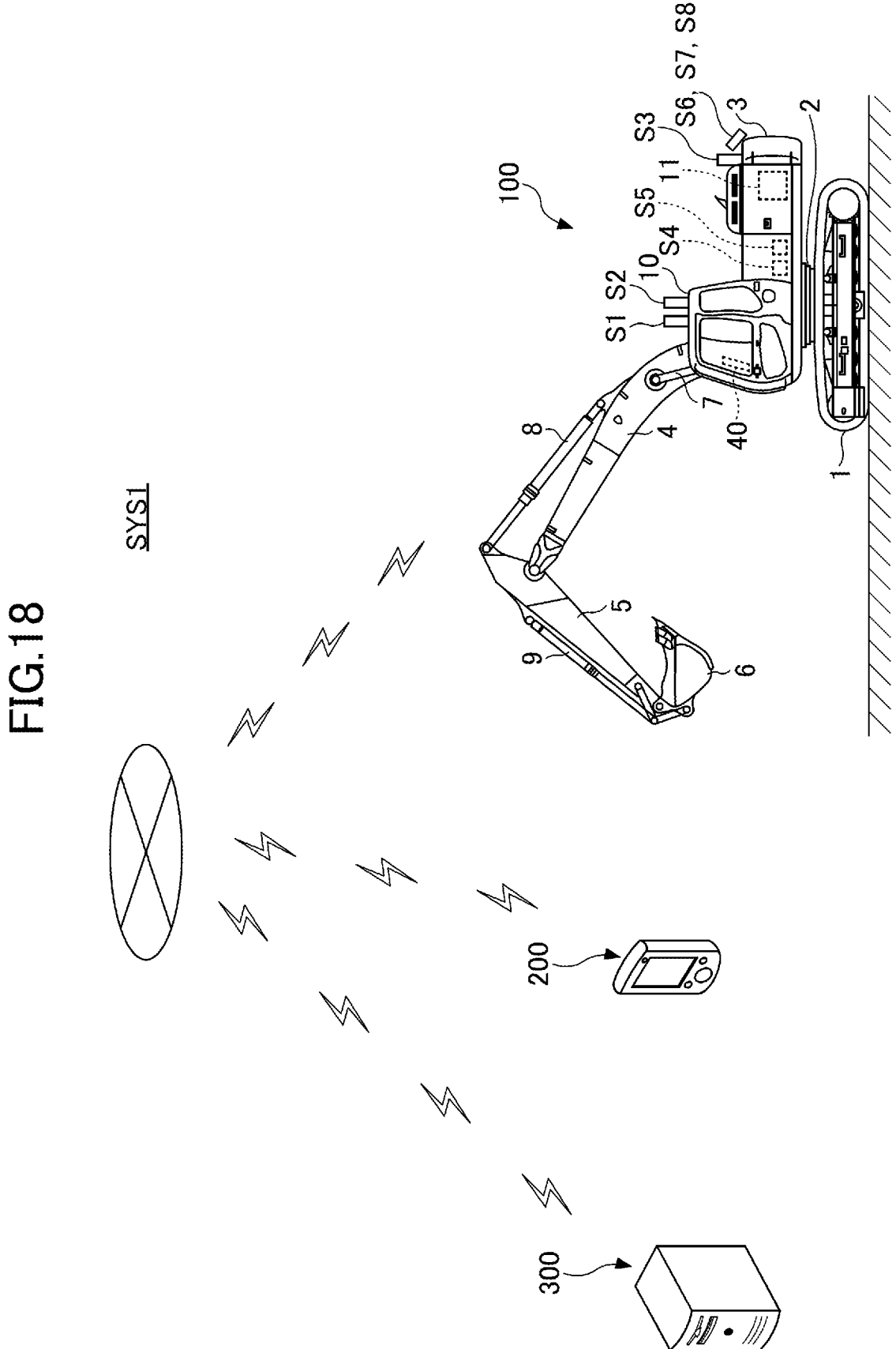
FIG. 18 is a schematic diagram illustrating an example of a configuration of an excavator management system according to another embodiment.

Other embodiments will now be described with reference to the drawings. FIG. 18 is a schematic diagram illustrating an example of a configuration of a management system for an excavator according to another embodiment. An management system SYS1 for an excavator illustrated in FIG. 18 is a system for managing one or more excavators 100.

In the present embodiment, the management system SYS1 primarily includes the excavator 100, the mobile terminal 200, and a management apparatus 300. In the management system SYS1, each of the excavator 100, the mobile terminal 200, and the management apparatus 300 may be a single unit or multiple units. In the example of FIG. 18, the management system SYS1 includes one excavator 100, one mobile terminal 200, and one management apparatus 300.

The management apparatus 300 is typically a fixed terminal apparatus, for example a server computer installed in a management center or the like outside the work site. The management apparatus 300 may be, for example, a mobile terminal apparatus such as a notebook PC, a tablet PC, or a smartphone.

Figure 19:
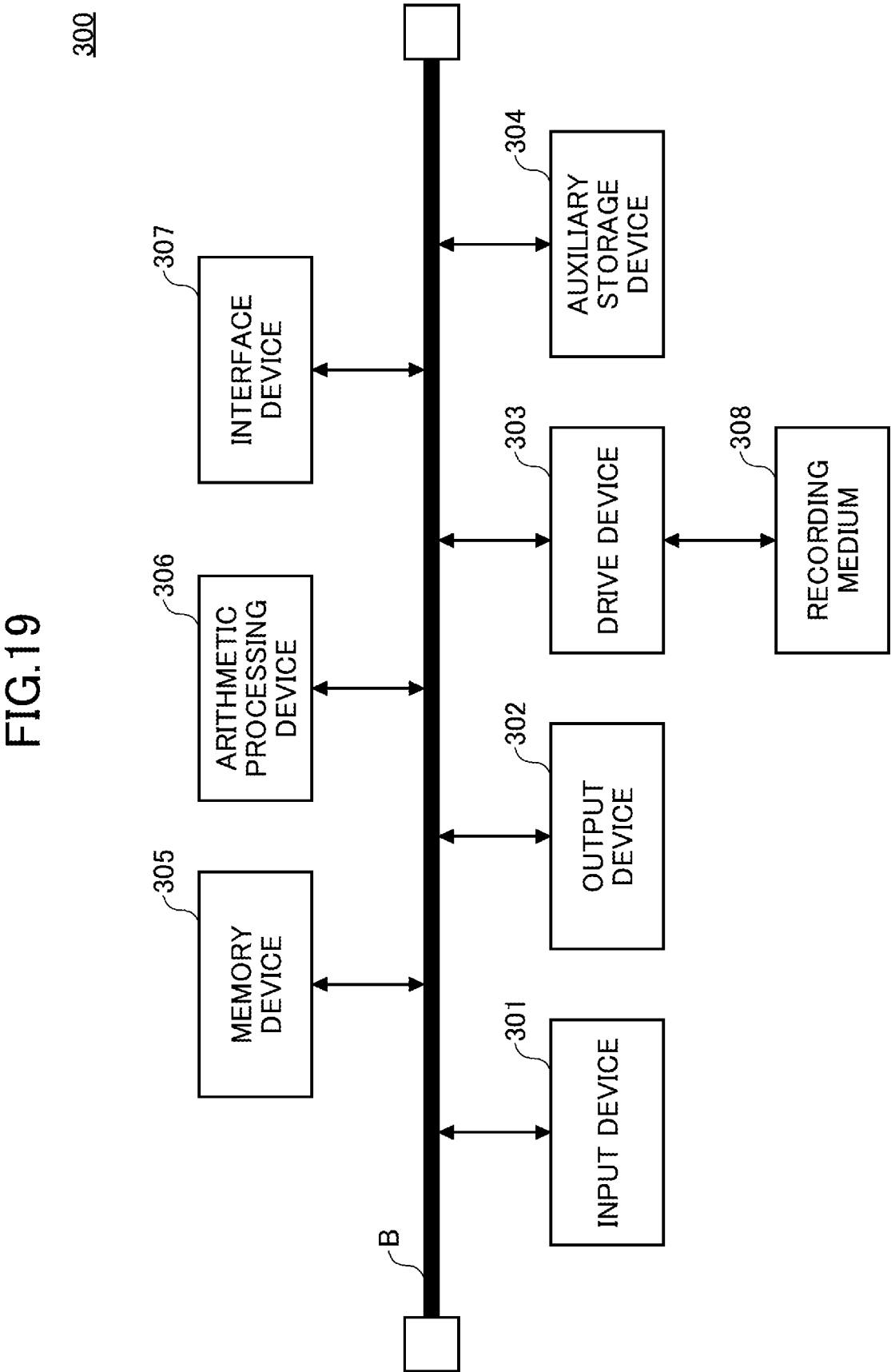
FIG. 19 is a diagram illustrating an example of a hardware configuration of a management apparatus.

Hereinafter, the management apparatus 300 according to the present embodiment will be described. FIG. 19 is a diagram illustrating an example of a hardware configuration of a management apparatus.

The management apparatus 300 according to the present embodiment is a computer including an input device 301, an output device 302, a drive device 303, an auxiliary storage device 304, a memory device 305, an arithmetic processing device 306, and an interface device 307, each of which is interconnected by a bus B1.

The input device 301 is a device for inputting various kinds of information and is implemented by a touch panel or the like. The output device 302 is for outputting various kinds of information and is implemented by, for example, a display. The interface device 307 is used to connect to the network.

The management program that implements each of the functions described below is at least a part of the various programs that control the management apparatus 300. The management program may be provided, for example, by being distributed in a storage medium 308 or by being downloaded from the network. The storage medium 308 in which the management program is recorded may be various types of storage media, such as a storage medium for optically, electrically, or magnetically recording information, or a semiconductor memory for electrically recording information, such as a ROM, a flash memory, or the like.

The management program is installed in the auxiliary storage device 304 from the storage medium 308 via the drive device 303 when the storage medium 308 including the management program is set in the drive device 303. The management program downloaded from the network is installed in the auxiliary storage device 304 via the interface device 307.

The auxiliary storage device 304 implementing a management information database 310 (see FIG. 20) described later is installed in the management apparatus 300 and stores the management program, and stores various files and data required by the management apparatus 300. The memory device 305 reads the management program from the auxiliary storage device 304 and stores the management program when the management apparatus 300 is activated. The arithmetic processing device 306 performs various kinds of processing as described below in accordance with the management program stored in the memory device 305.

Figure 20:
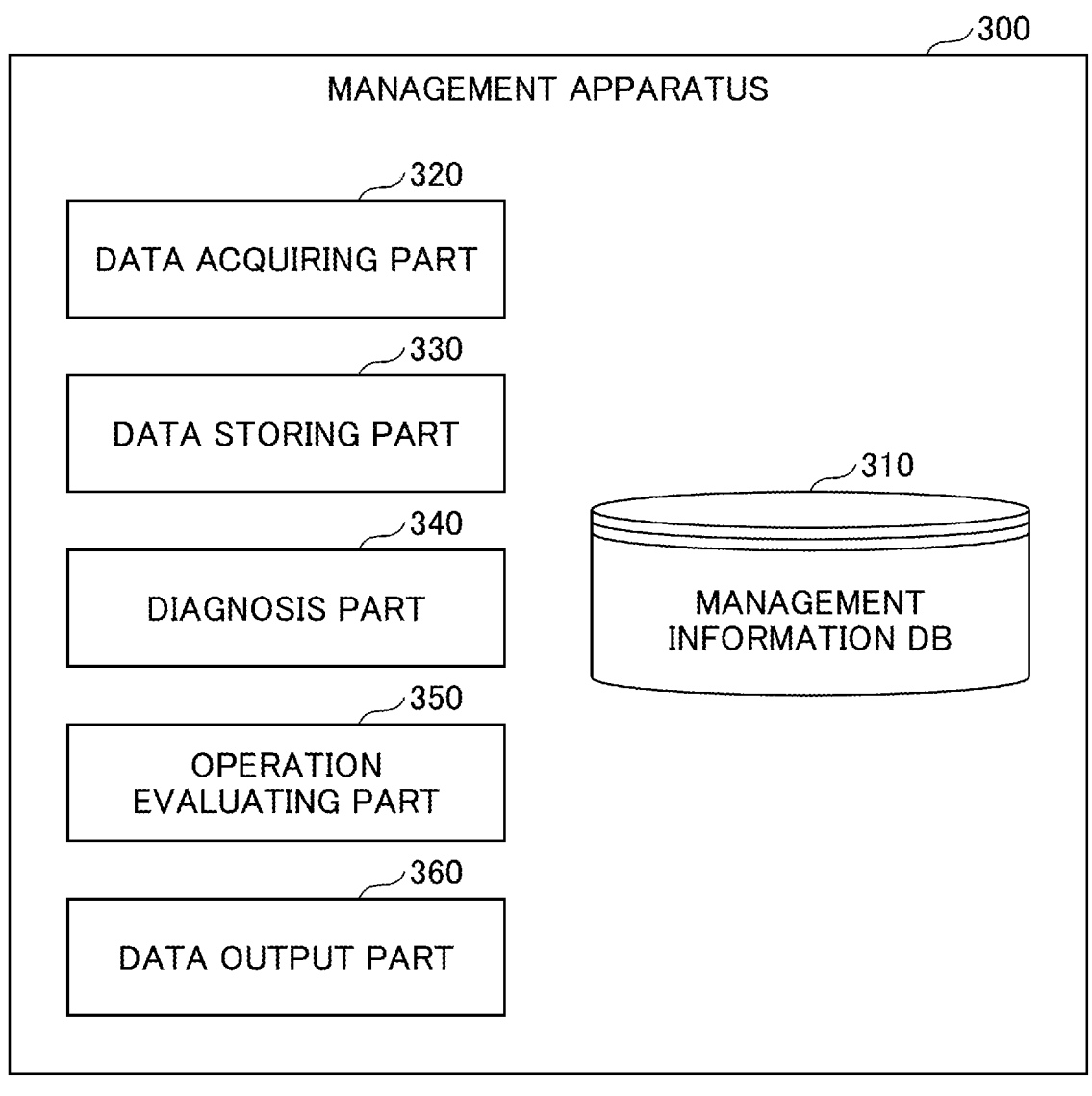
FIG. 20 is a diagram illustrating an example of a functional configuration of a management apparatus.

Next, the functional configuration of the management apparatus 300 according to the present embodiment will be described with reference to FIG. 20. FIG. 20 is a diagram illustrating an example of a functional configuration of a management apparatus.

The management apparatus 300 according to the present embodiment includes the management information database 310, a data acquiring part 320, a data storing part 330, a diagnosis part 340, an operation evaluating part 350, and a data output part 360.

The management information database 310 is implemented by a storage device such as an auxiliary storage device 304, a memory device 305, or the like. The data acquiring part 320, the data storing part 330, the diagnosis part 340, the operation evaluating part 350, and the data output part 360 are implemented as the arithmetic processing device 306 reads a program stored in the auxiliary storage device 304, the memory device 305, or the like and executes the program.

The management information database 310 stores various kinds of information used for the management of the excavator 100. The information stored in the management information database 310 includes, for example, the state record data 280, the diagnosis result information representing the diagnosis result of whether the excavator 100 has a failure based on the state record data 280, the evaluation result information representing the evaluation result of the operation of the excavator 100, and the like.

The management information according to the present embodiment may be stored in each excavator 100. The management information may also include a plurality of pieces of the state record data 280 acquired at different dates and times for each machine number of the excavator 100.

The data acquiring part 320 acquires various kinds of information stored in the management information database 310. Specifically, the data acquiring part 320 acquires the state record data 280 transmitted from the mobile terminal 200.

The data storing part 330 stores information acquired by the data acquiring part 320 and information obtained as a result of the processing by the diagnosis part 340 and the operation evaluating part 350 as management information in the management information database 310.

When the excavator 100 receives a request for a diagnosis regarding the operation from the mobile terminal 200, the diagnosis part 340 may perform diagnosis of whether there is a failure or the degree of deterioration of the excavator 100 and report, to the mobile terminal 200, the result of the diagnosis. The diagnosis result obtained by the diagnosis part 340 is stored in the management information database 310 as a part of the management information.

Specifically, the diagnosis part 340 may, for example, analyze the state quantity information and diagnose (determine) that there is a failure when the value of a predetermined item among the items included in the state quantity information is greater than or equal to a predetermined threshold value.

Further, the diagnosis part 340 may diagnose the degree of deterioration of the excavator 100 or the like by using a plurality of pieces of the state record data 280 obtained at different dates and times for one excavator 100. At this time, the diagnosis part 340 may convert the image of the excavator 100 in the video into a link model and perform diagnosis of an operation based on the link model.

A link model is a suitable model for comparing the postures of the excavator 100. Specifically, the link model according to the present embodiment is a three-dimensional image in which the posture of the excavator 100 is simply drawn on the basis of a region representing the lower traveling body 1, the turning mechanism 2, and the upper turning body 3 in the image of the excavator 100, points of a link mechanism connecting the upper turning body 3 and the boom 4, points of a link mechanism connecting the boom 4 and the arm 5, points of a link mechanism connecting the arm 5 and the bucket 6, and points of the claw tip of the bucket.

The operation evaluating part 350 evaluates the operation of the excavator 100 based on the state record data 280 acquired from the mobile terminal 200.

The operation evaluating part 350 evaluates the operation of the excavator 100 based on, for example, an instruction value corresponding to a type of operation of the excavator 100, a detection value from a sensor, and a posture of the excavator 100 in a video.

Specifically, for example, the operation evaluating part 350 outputs information indicating that the calibration of the sensor is necessary as an evaluation result when the instruction value coincides with the detection value from the sensor and when the posture of the excavator 100 in the video is different from the position indicated by the instruction value.

The evaluation result obtained by the operation evaluating part 350 is transmitted to the mobile terminal 200. The evaluation result of the operation evaluating part 350 is stored in the management information database 310 as a part of the management information by the data storing part 330.

The data output part 360 outputs (transmits) various kinds of information from the management apparatus 300 to an external device. An external device is, for example, the mobile terminal 200. Specifically, when the data output part 360 receives, from the mobile terminal 200, a playback request to play back the state record data 280 stored in the input receiving part 210, the data output part 360 transmits the state record data 280 stored in the management information database 310 to the mobile terminal 200.

Figure 21:
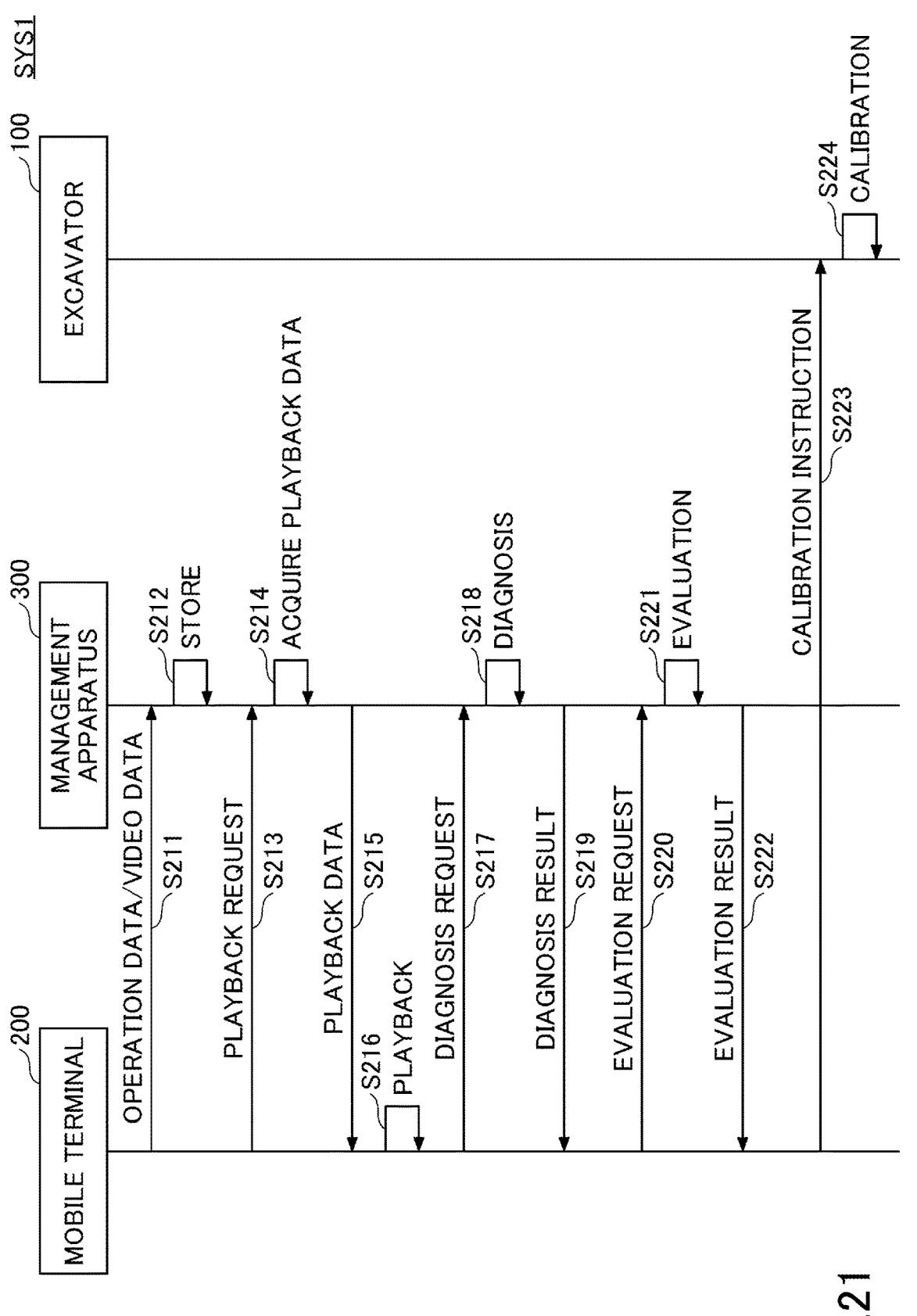
FIG. 21 is a sequence diagram explaining the operation of the management system.

Next, the operation of the management system SYS1 according to the present embodiment will be described with reference to FIG. 21. FIG. 21 is a sequence diagram illustrating the operation of the management system.

In step S211, in the management system SYS1, the mobile terminal 200 receives an operation instructing the transmission of the state record data 280 and transmits the state record data 280 to the management apparatus 300.

In step S212, the management apparatus 300 acquires the state record data 280 by the data acquiring part 320 and stores the state record data 280 in the management information database 310 by the data storing part 330.

In step S213, when the operation button 155 is operated in the playback screen displayed on the mobile terminal 200 (see FIG. 15), the management system SYS1 transmits the playback request of the selected state record data 280 to the management apparatus 300.

In the mobile terminal 200, a list screen of the state record data 280 for selecting the state record data 280 to be played back may be displayed before the playback screen is displayed.

In this case, the management apparatus 300 may transmit a list of the state record data 280 stored in the management information database 310 to the mobile terminal 200 and cause the mobile terminal 200 to display the list screen.

In step S214, the management apparatus 300 reads the state record data 280 stored in the management information database 310 by the data output part 360 upon receiving the playback request of the state record data 280 from the mobile terminal 200. Subsequently, in step S215, the management apparatus 300 transmits the read-out state record data 280 to the mobile terminal 200 by the data output part 360.

In step S216, the mobile terminal 200 receives the state record data 280 and plays back the received state record data 280.

In step S217, in the management system SYS1, when the mobile terminal 200 receives an operation requesting diagnosis of the excavator 100, the mobile terminal 200 makes a diagnosis request to the management apparatus 300.

In step S218, when the data acquiring part 320 receives the diagnosis request, the management apparatus 300 performs the diagnosis based on the state record data 280 by the diagnosis part 340. Subsequently, in step S219, the management apparatus 300 transmits the diagnosis result to the mobile terminal 200.

In the present embodiment, the video data in which the image of the excavator 100 is converted into a link model of may be transmitted to the mobile terminal 200 as the diagnosis result. In the mobile terminal 200, the video data in which the image of the excavator 100 is converted into a link model may be played back.

Video data in which an image of an excavator is converted into a link model is video data in which a link model is superimposed on or replaced with an image of the excavator 100 in the video data captured by the imaging device 208. In the following description, video data in which a link model is superimposed on or replaced with an image of the excavator 100 may be referred to as the diagnosis video data.

When the mobile terminal 200 receives the evaluation request of the operation of the excavator 100 in the management system SYS1 (step S220), in step S221, the operation evaluating part 350 performs the evaluation of the operation of the excavator 100 based on the state record data 280. Subsequently, in step S222, the management apparatus 300 transmits information representing the evaluation result to the mobile terminal 200 by the data output part 360. The mobile terminal 200 displays an evaluation result screen representing the evaluation result upon receipt of information indicating the evaluation result.

Here, in step S223, the mobile terminal 200 according to the present embodiment transmits an instruction for calibration of the sensor to the excavator 100 when the evaluation result includes information indicating that calibration of the sensor is necessary. This instruction may include sensors for which calibration is required and information required for performing the calibration. In step S224, the excavator 100 performs calibration of the specified sensor in response to this instruction.

In FIG. 21, the operations from step S211 to step S216, the operations from step S217 to step S219, and the operations from step S220 to step S224 may be performed at independent timings.

In the present embodiment, for example, the playback request in step S213 of FIG. 21 may include a diagnosis request using the state record data 280 to be played back and an evaluation request. In this case, in step S216, from the playback of the state record data 280 to the acquisition of the evaluation result of step S222 are executed as a series of processes in the mobile terminal 200.

Next, the process of the diagnosis part 340 of the management apparatus 300 according to the present embodiment will be described with reference to FIGS. 22 to 25.

Figure 22:
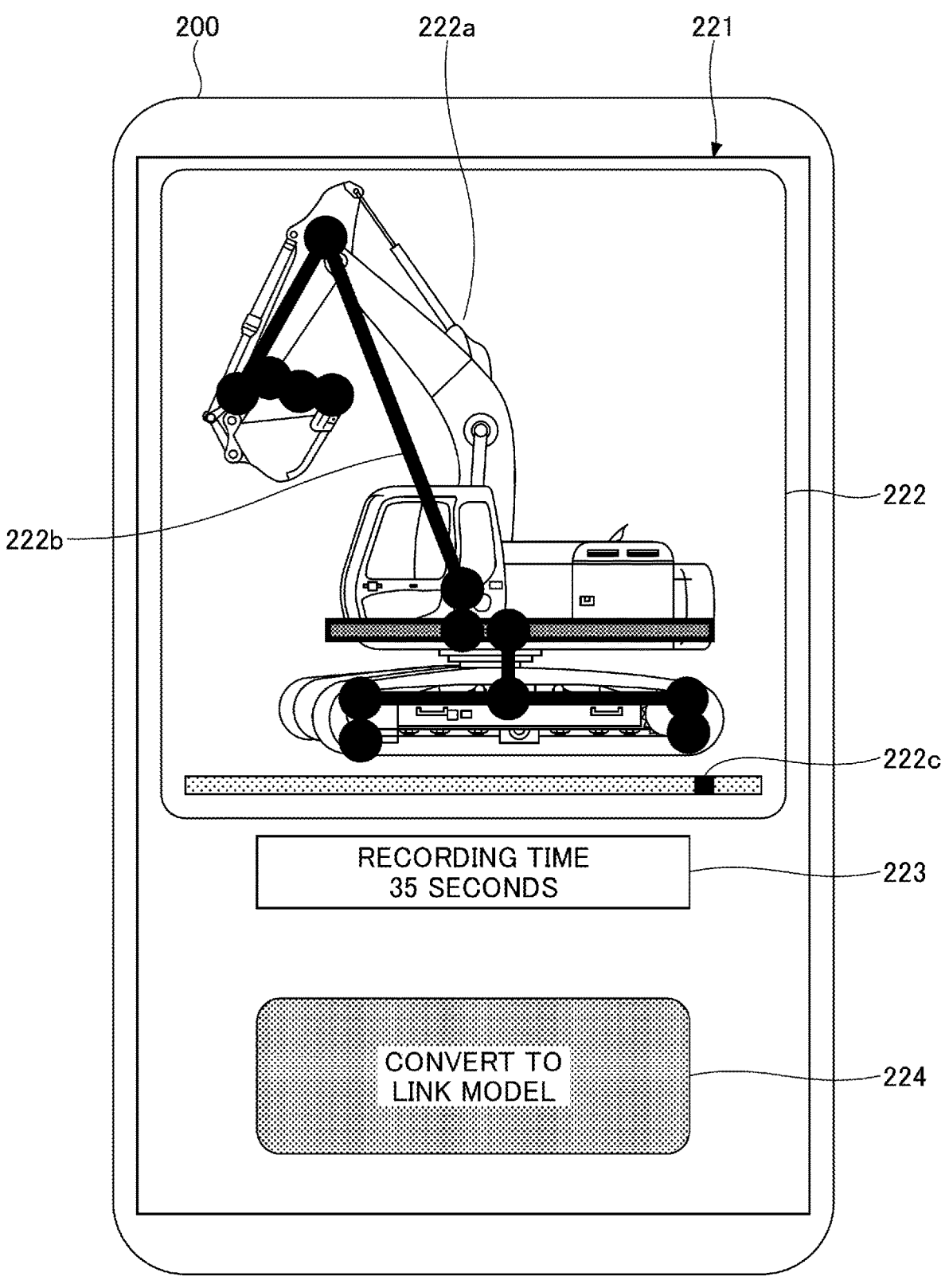
FIG. 22 is a first diagram illustrating an example of a playback screen of diagnosis video data.

FIG. 22 is a first diagram illustrating an example of a playback screen of diagnosis video data. The screen 221 illustrated in FIG. 22 may be displayed on the display device 202 of the mobile terminal 200 in step S219 of FIG. 21, for example.

The screen 221 includes display areas 222 and 223 and an operation button 224. In the display area 222, an image 222a of the excavator 100 captured by the imaging device 208 and a link model 222b generated from the image 222a are superimposed and displayed.

The display area 222 displays an elapsed time display bar 222c. The display area 223 displays the time elapsed from the start time of recording the video. On the screen 221, the elapsed time display bar 222c and the time displayed in the display area 223 are synchronized. The image displayed on the display area 222 is the image corresponding to the time indicated by the elapsed time display bar 222c and the display area 223 among the plurality of still images included in the video.

In the example of FIG. 22, it can be seen that the image at 35 seconds after the start time of the recording is displayed in the display area 222.

The operation button 224 is an operation button for converting an image displayed in the display area 222 to an image of only the link model 222b.

When the operation button 224 is operated on the screen 221, the mobile terminal 200 causes the screen 221 to transition to a screen from which the image 222a of the excavator 100 is erased. When the operation button 224 is operated, the mobile terminal 200 may stop playing back the diagnosis video data and erase the image 222a of the excavator 100 from the image displayed in the display area 222 at the time the operation button 224 is operated.

Figure 23:
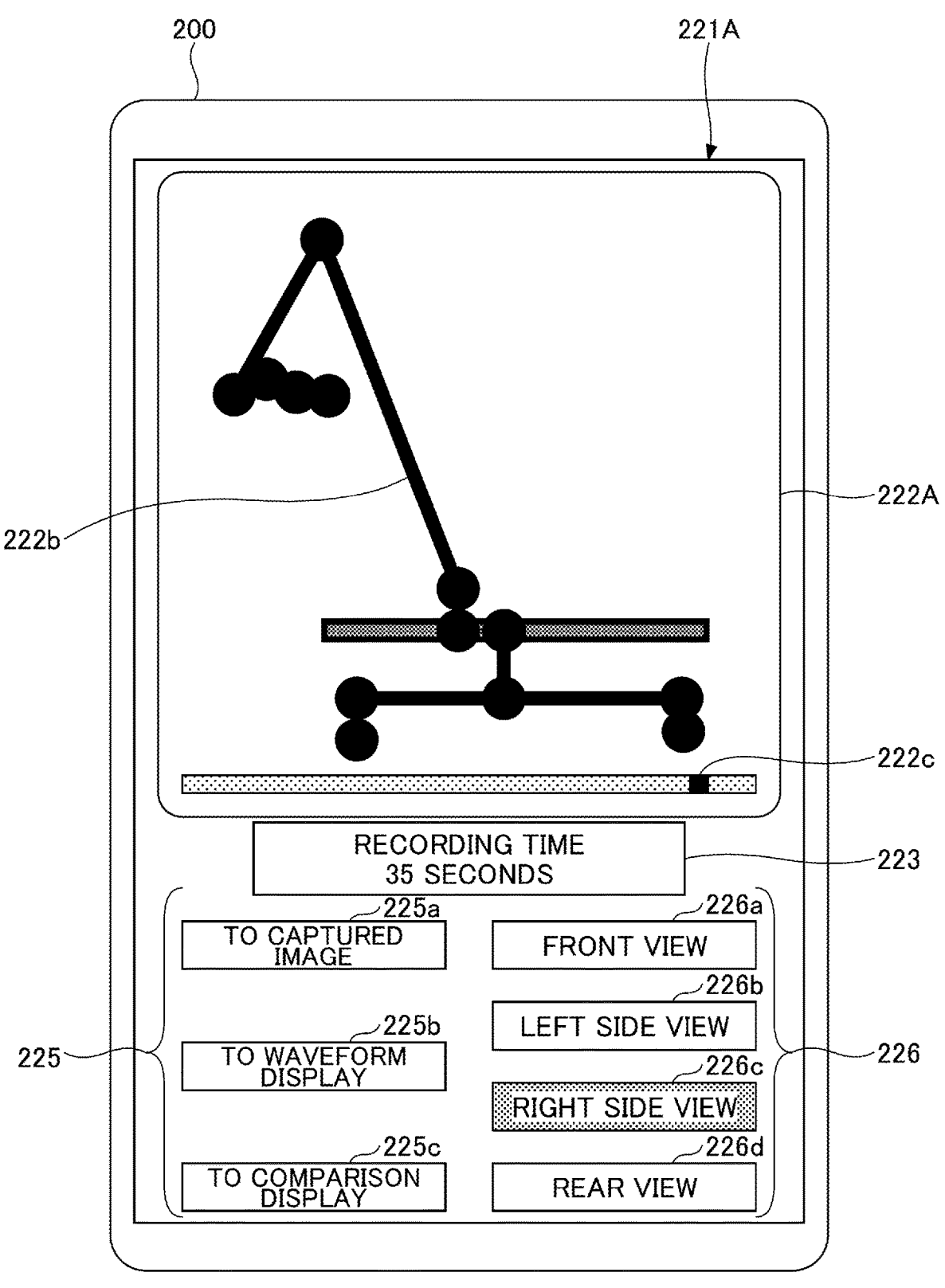
FIG. 23 is a second diagram illustrating an example of a playback screen of diagnosis video data.

FIG. 23 is a second diagram illustrating an example of a playback screen of diagnosis video data. A screen 221A illustrated in FIG. 23 is an example of a screen displayed on a display device 202 of a mobile terminal 200 after an operation button 224 is operated on a screen 221.

The screen 221A includes display areas 222A and 223 and operation button groups 225 and 226. In the display area 222A, the image 222a of the excavator 100 is erased and only the link model 222b is displayed.

The operation button group 225 is a group of operation buttons for switching an image displayed in the display area 222A to a plurality of different images and includes operation buttons 225a, 225b, and 225c.

The operation button 225a is an operation button for switching the image displayed on the display area 222A from the link model 222b to the captured image. The operation button 225b is an operation button for switching the image displayed in the display area 222A from the link model 222b to the waveform of the state quantity information.

The operation button 225c is an operation button for switching the image displayed in the display area 222A from the link model 222b to a contrast image of link models.

The operation button group 226 is a group of operation buttons for switching the link model 222b displayed in the display area 222A to a link model when viewed from a plurality of different directions, and includes operation buttons 226a, 226b, 226c, and 226d.

The operation button 226a is an operation button for switching the link model 222b to a link model of the state viewed from the front (front view). The operation button 226*b* is an operation button for switching the link model 222*b* to a link model of the state viewed from the left (left side view).

The operation button 226*c* is an operation button for switching the link model 222*b* to a link model of the state viewed from the right (right side view). The operation button 226*d* is an operation button for switching the link model 222*b* to a link model of the state viewed from the rear (rear side view). On the screen 221A illustrated in FIG. 23, the operation button 226*c* is selected.

Figure 24:
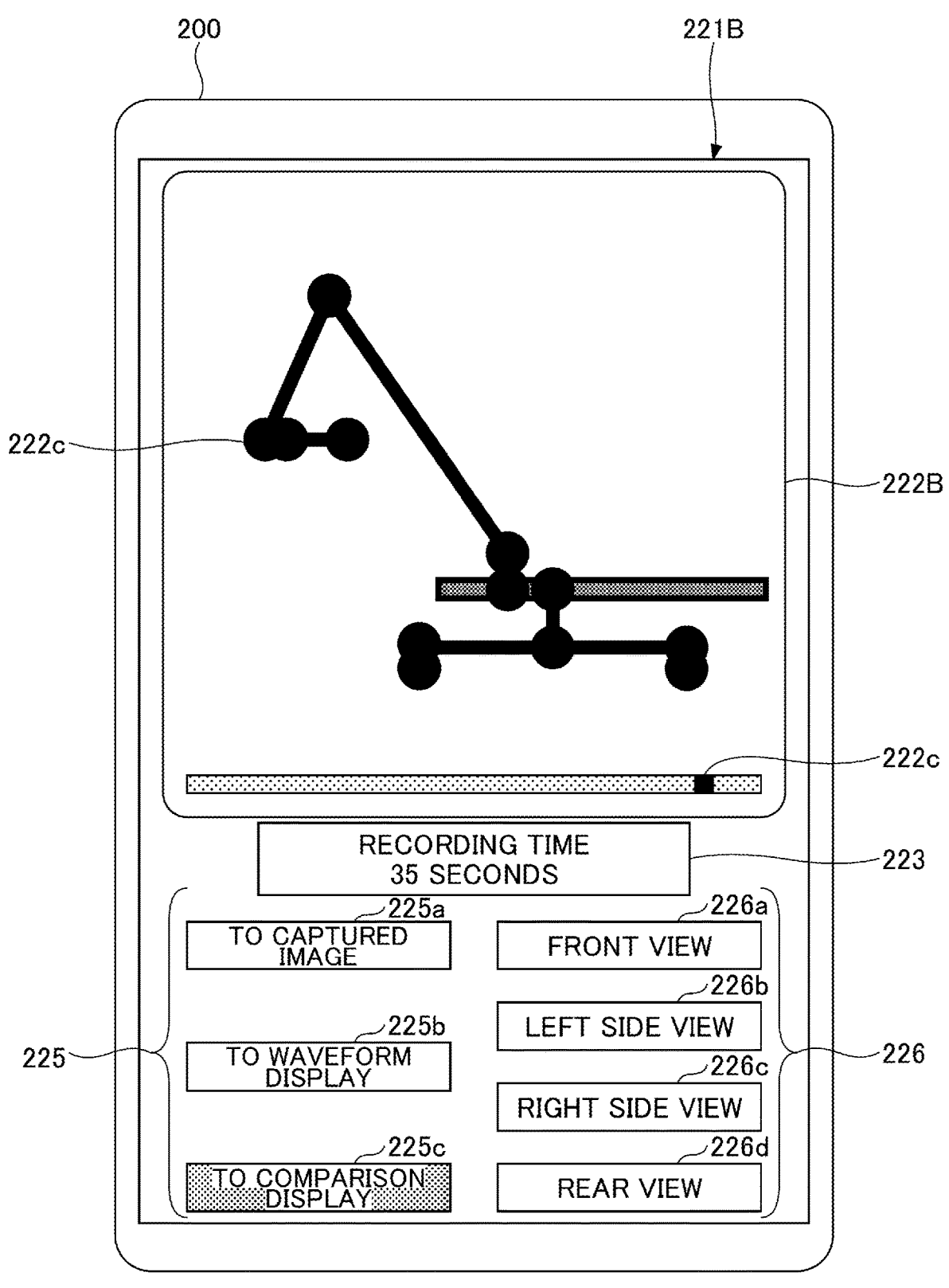
FIG. 24 is a third diagram illustrating an example of a playback screen of diagnosis video data.

FIG. 24 is a third diagram illustrating an example of a playback screen of diagnosis video data. A screen 221B illustrated in FIG. 24 is an example of a screen displayed on the display device 202 of the mobile terminal 200 after the operation button 226*c* is operated on the screen 221A.

The screen 221B illustrated in FIG. 24 includes display areas 222B and 223 and operation button groups 225 and 226. Further, in the display area 222B, a link model 222*c* in which the link model 222*b* is the right side view is displayed. Further, the operation button 225*c* is selected on the screen 221B.

Figure 25:
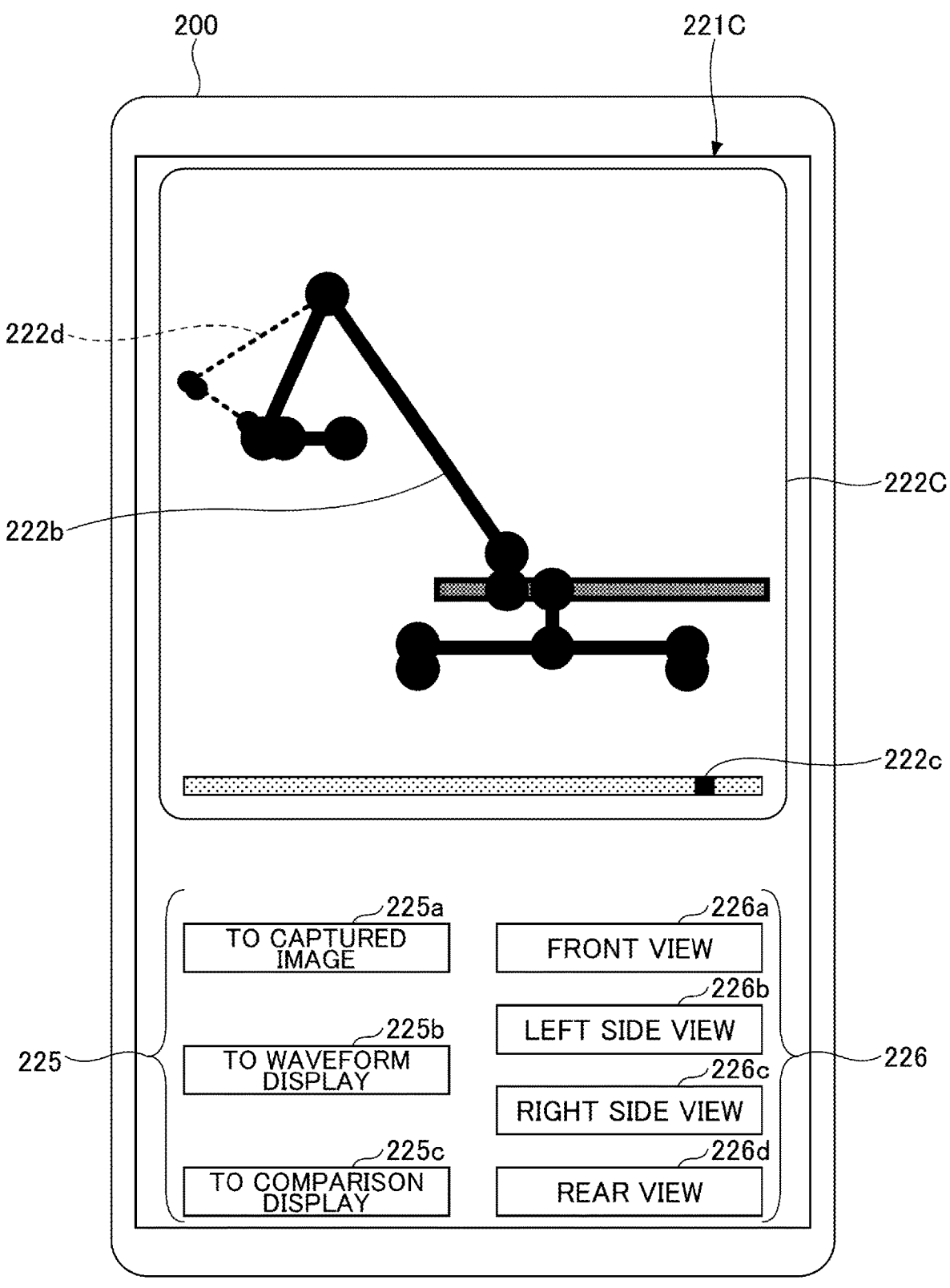
FIG. 25 is a fourth diagram illustrating an example of a playback screen of diagnosis video data.

FIG. 25 is a fourth diagram illustrating an example of a playback screen of diagnosis video data. A screen 221C illustrated in FIG. 25 is an example of a screen displayed on the display device 202 of the mobile terminal 200 after the operation button 225*c* is operated on the screen 221B.

The screen 221C includes a display area 222C and operation button groups 225 and 226. On the screen 221C, an image in which the link model 222*d* and a link model 222*d'* extracted from the diagnosis video data generated from a previously acquired state record data 280' are superimposed is displayed in the display area 222C.

Here, the relationship between the link model 222*d* and the link model 222*d'* will be described.

The past state record data 280' on which the link model 222*d'* is based, is acquired further in the past than the state record data 280 on which the link model 222*d* is based. Further, the operation of the excavator 100 when the state record data 280 is acquired and the operation of the excavator 100 when the state record data 280' is acquired are the same. Further, the elapsed time from the start of recording the video data included in the state record data 280 to the appearance of the still image that is the source of the link model 222*d* and the elapsed time from the start of recording the video data included in the state record data 280' to the appearance of the still image that is the source of the link model 222*d'* are the same.

That is, the link model 222*d* and the link model 222*d'* indicate the posture of the excavator 100 in each time period, when the excavator 100 performs the same operation at different time periods, and a predetermined time elapses from the start of the operation.

Here, when the operation performed by the excavator 100 is a prescribed operation, the excavator 100 operates based on the same instruction value in each time period, and, therefore, the link model 222*d* and the link model 222*d'* match each other. Accordingly, if the link model 222*d* and the link model 222*d'* do not match each other, it is suspected that some kind of abnormality is occurring in the excavator 100 or that the deterioration of the machine body is progressing.

In the example of FIG. 25, the link model 222*d* and the link model 222*d'* do not match each other, and, therefore, the user of the mobile terminal 200 can identify that a failure of the excavator 100 or progress in deterioration of the machine body is suspected.

Note that a message indicating that a failure of the excavator 100, progress of deterioration of the machine body, or the like is suspected may be displayed on the screen 221C as the result of the diagnosis by the diagnosis part 340.

The diagnosis part 340 according to the present embodiment may diagnose that, for example, when the deviation between the link model 222*d* and the link model 222*d'* is less than a predetermined threshold value, there is deterioration of the machine body, and when the deviation is greater than or equal to a predetermined threshold value, there is an abnormality in the machine body.

According to the present embodiment, the display area 222C may include a display field for displaying the video data of the link model based on the past state record data 280' and a display field for displaying the video data of the link model based on the state record data 280, and the two pieces of motion data may be played back at the same time.

In this manner, pieces of video data of link models based on the state record data 280 acquired at different time periods can be played back in parallel, so that the user of the mobile terminal 200 can identify the difference in the speed of the operation of the excavator 100 or the difference in vibration or the like in each time period.

In the present embodiment, pieces of diagnosis video data generated from the state record data 280 acquired at different time periods can be compared with each other. Therefore, for example, by comparing the state record data 280 acquired in a state in which an abnormality has occurred in the excavator 100 with the state record data 280 acquired after repairing the excavator 100, the user of the mobile terminal 200 can confirm whether the repair has been completed.

In the present embodiment, a method of using the diagnosis video data generated from the video data has been described as a method for comparing pieces of the state record data 280 acquired at different time periods. However, the method of comparing the state record data 280 is not limited thereto.

For example, in the present embodiment, waveform data of the same item of state quantity information may be acquired from each of the pieces of the state record data 280 acquired at different time periods, and the waveform data may be superimposed on each other for comparison.

Figure 26:
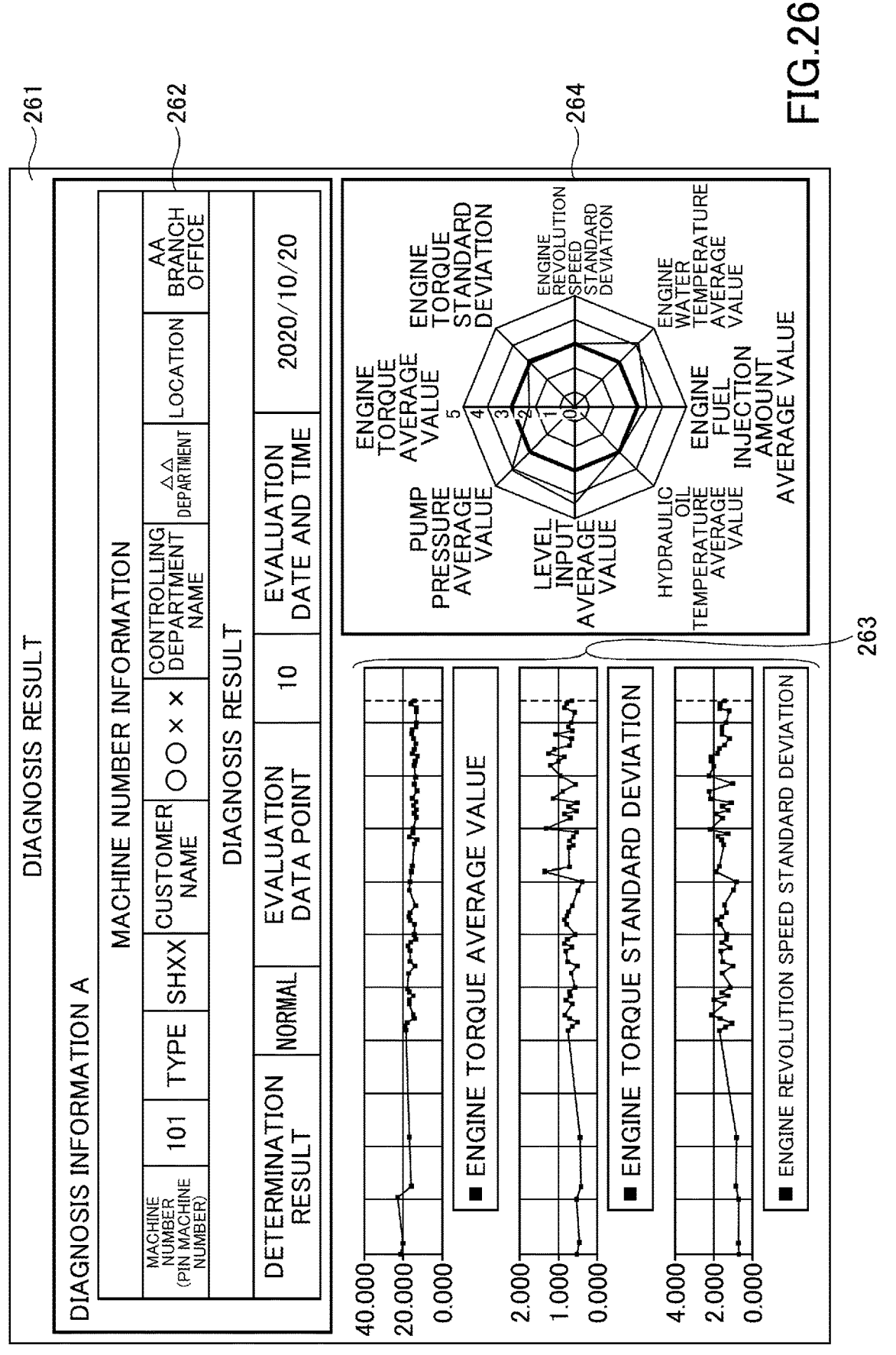
FIG. 26 is a first diagram illustrating an example of the display of evaluation results.

Next, the process of the operation evaluating part 350 of the present embodiment will be described with reference to FIGS. 26 to 28. FIG. 26 is a first diagram illustrating an example of the display of the evaluation results.

The screen 261 illustrated in FIG. 26 is an example of the evaluation result screen displayed on the display device 202 of the mobile terminal 200 in step S222 of FIG. 21.

A screen 261 includes display areas 262, 263, and 264. In the display area 262, a portion of the bibliographic information of the excavator 100 subject to evaluation of operation and a diagnosis result by the diagnosis part 340 are displayed. The information displayed on the display area 262 is not limited thereto. The display area 262 is to include at least the machine number of the excavator 100, among the bibliographic information included in the state record data 280.

The display area 263 represents the waveform for each item of state quantity information included in state record data 280. The item of the state quantity information displayed in the display area 263 may be an item represented by the display item information included in the state record data 280.

The waveform displayed in the display area 263 may be a waveform or the like of an average value calculated each time a detection value of the sensor is acquired.

In the present embodiment, the waveform of the item for which an abnormality is diagnosed may be displayed in the display area 263 in comparison with the state quantity information obtained a normal state in the past. In this case, a message may be displayed in the display area 263 indicating that the item is an item that has been diagnosed as having an abnormality.

In the present embodiment, the state quantity information may be compared with state quantity information included in the past state record data 280', and an item having a different waveform may be identified, and the waveform of the identified item may be displayed in the display area 263. In this case, a message may be displayed in the display area 263 indicating that the item displayed in the display area 263 is an item that should be prioritized when performing the confirmation.

As described above, according to the present embodiment, when the evaluation result of the operation evaluating part 350 is displayed, the item of the state quantity information that is diagnosed to be abnormal and the item of the state quantity information that should be prioritized when performing the confirmation are displayed, so that the user of the mobile terminal 200 can identify the item that should be confirmed.

The display area 264 displays a radar chart with items included in the state quantity information being the axes. The items displayed in the display area 264 may be the same as the items for which the waveforms are displayed in the display area 263. The item displayed in the display area 264 may be an item indicated by the display item information.

In the present embodiment, by displaying the evaluation result as a radar chart, the balance of the operations of the respective parts of the excavator 100 can be easily identified by a user of the mobile terminal 200.

Figure 27:
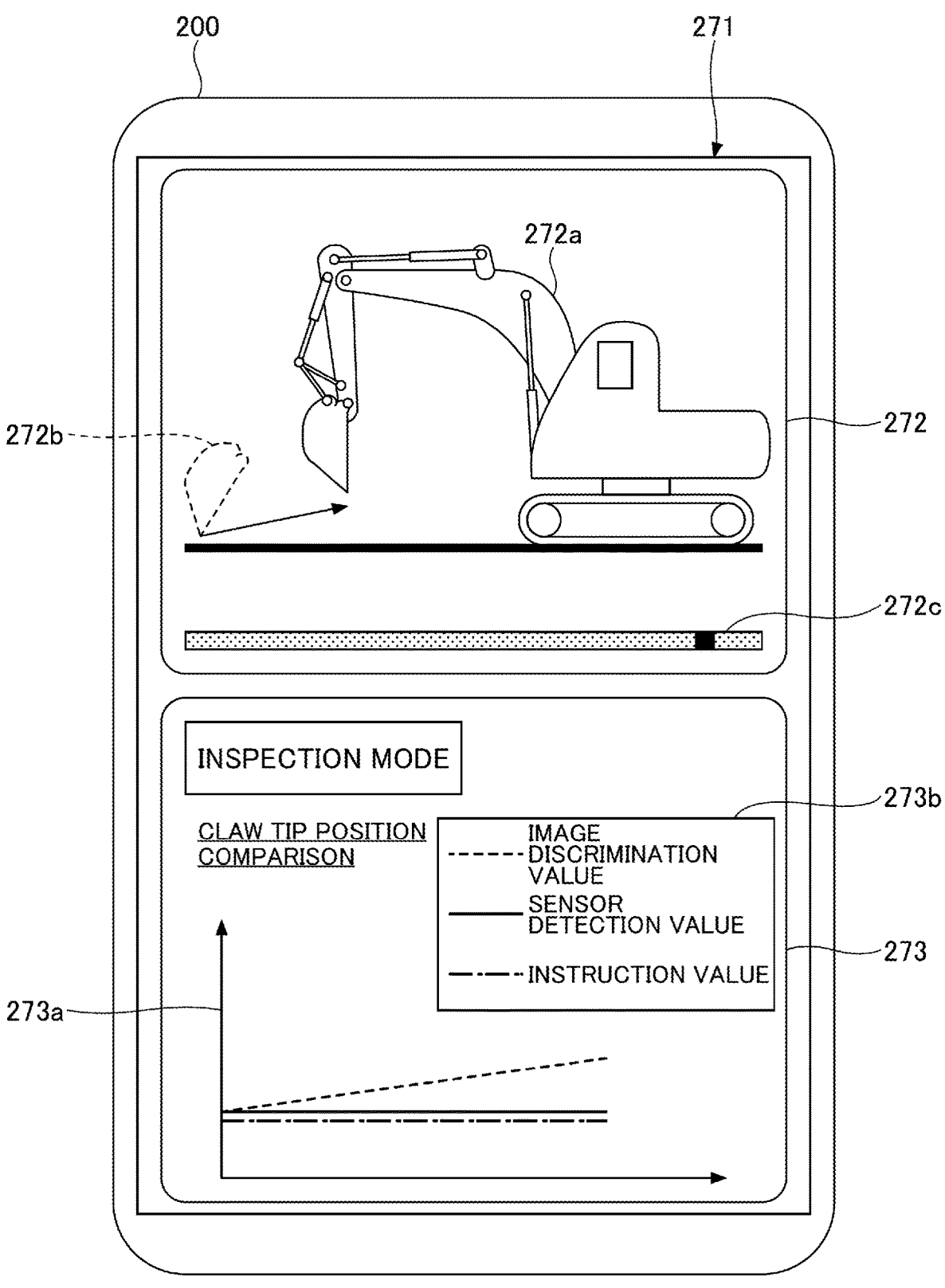
FIG. 27 is a second diagram illustrating an example of the display of evaluation results.

FIG. 27 is a second diagram illustrating an example of the display of the evaluation result. A screen 271 illustrated in FIG. 27 is a display example of an evaluation result when comparing the position of the claw tip at the start time of the operation in the "horizontal pulling operation" with the position of the claw tip after the start of the operation, as an evaluation of the operation. The "horizontal pulling operation" is one of the prescribed operations.

The screen 271 includes display areas 272 and 273. In the display area 272, an image 272a of the excavator 100, an image 272b of the bucket 6, and an elapsed time display bar 272c are displayed.

The image 272b of the excavator 100 is a still image of the excavator 100 at the time indicated by the elapsed time display bar 272c, and the image 272b is an image indicating the position of the bucket 6 in the still image of the excavator 100 at the start of playback of the video data.

The displayed area 273 displays a graph 273a and information 273b indicating the type of value illustrated in the graph. A graph 273a is a graph in which the vertical axis is an instruction value, a detection value of an angle sensor, and an image discrimination value, and the horizontal axis is a time. Information 273b indicates that the item whose value is indicated in the graph is the instruction value, the detection value of the angle sensor, and the image discrimination value, and that the dotted line in the graph corresponds to the image discrimination value, the solid line corresponds to the detection value, and the chain line corresponds to the instruction value.

The image discrimination value according to the present embodiment is a value representing the difference between the position of the claw tip in the image 272a displayed in the display area 272 and the position of the claw tip in the image 272b. More specifically, the image discrimination value is a value representing the difference between the height of claw tip in the image 272a and the height of claw tip in the image 272b.

In the example of FIG. 27, the "horizontal pulling operation" is performed as the prescribed operation, and, therefore, if the excavator 100 is in the normal state, the height of the claw tip of the excavator 100 before and after the start of the operation is constant, and the image discrimination value does not change.

In the graph 273a illustrated in the display area 273 of the screen 271, the instruction value for causing the "horizontal pulling operation" to be performed matches the detection value of the angle sensor of the excavator 100, but the image discrimination value is changed. In this case, it is assumed that the reference value of the angle sensor is out of alignment.

In the present embodiment, by comparing the video of the excavator 100 with the instruction value and the detection value of the sensor, the actual operation of the excavator 100 when control for performing the prescribed operation is performed by the excavator 100 can be identified by a user of the mobile terminal 200. Further, according to the present embodiment, the user of the mobile terminal 200 can identify that the actual operation has deviated from the prescribed operation even though the control for performing the prescribed operation is performed by the excavator 100.

In the example of FIG. 27, a message indicating that the actual operation is different from the prescribed operation even though the excavator 100 is performing control for performing the prescribed operation and that calibration of the angle sensor is necessary, may be displayed in the display area 273.

In the present embodiment, an operation button for instructing the calibration of the angle sensor to the excavator 100 may be displayed on the screen 271. When this operation button is operated, the mobile terminal 200 may transmit a calibration instruction of the reference value of the angle sensor to the excavator 100, together with information identifying the angle sensor for which calibration is required, to the excavator 100. At this time, the mobile terminal 200 may calculate the deviation of the reference value of the angle sensor based on the image discrimination value and transmit the deviation to the excavator 100 together with the calibration instruction. The excavator 100 performs the calibration of the angle sensor in response to this calibration instruction.

The deviation of the reference value may be calculated by the operation evaluating part 350 of the management apparatus 300. In this case, the deviation of the reference value is transmitted from the management apparatus 300 to the mobile terminal 200 as a part of the evaluation result of the operation evaluating part 350.

Thus, according to the present embodiment, when the excavator 100 performs the prescribed operation but the operation is different from the prescribed operation, the sensor of the excavator 100 can be easily calibrated.

Figure 28:
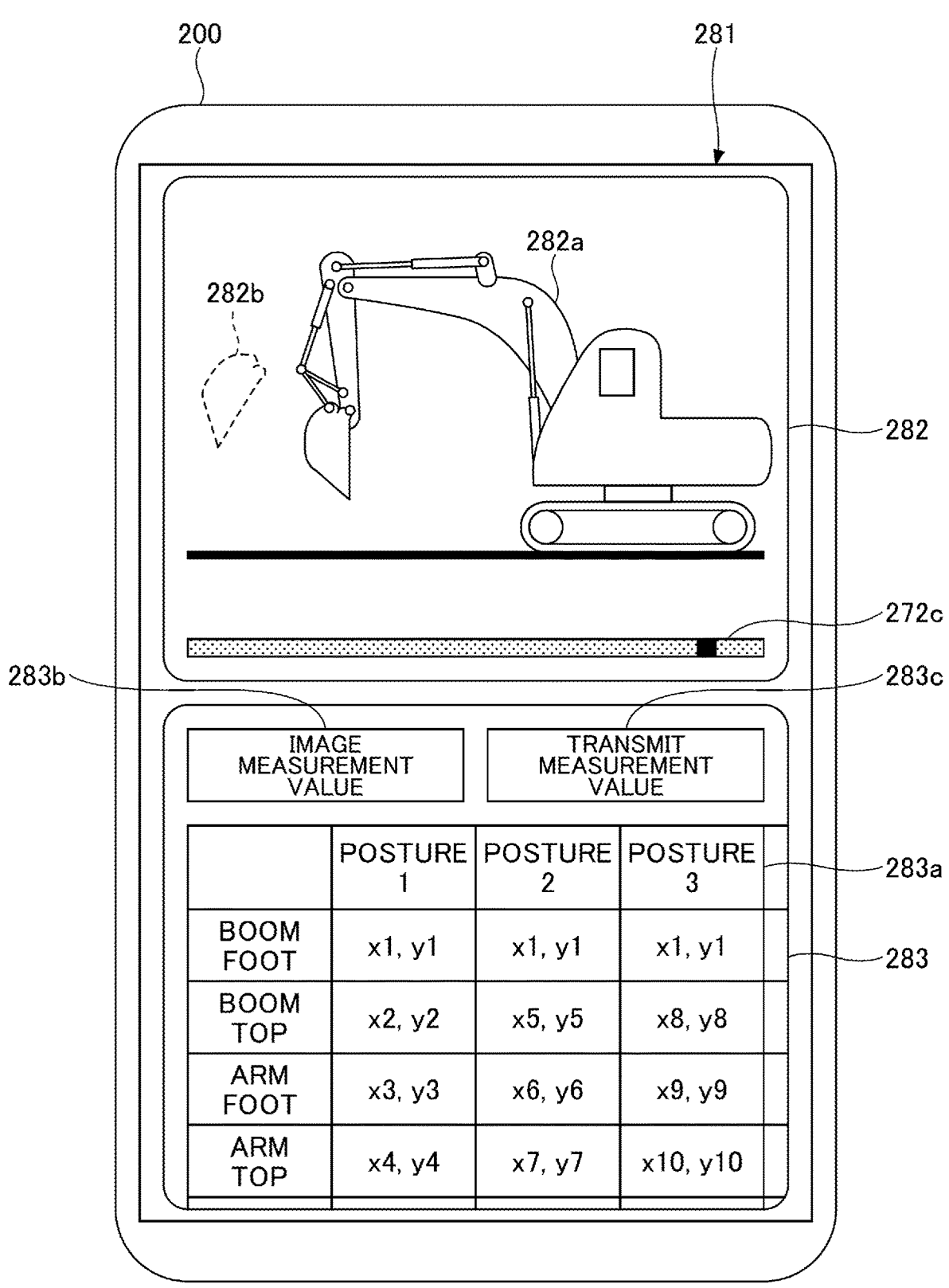
FIG. 28 is a third diagram illustrating an example of the display of evaluation results.

FIG. 28 is a third diagram illustrating an example of the display of the evaluation result. The screen 281 illustrated in FIG. 28 is a display example of an evaluation result in which positions of a predetermined portion of the excavator 100 are identified from images of the excavator 100 of several postures, and the positions of the predetermined portion at the respective postures are compared, as one of the operational evaluations. Incidentally, the process described with reference to FIG. 28 may be performed mainly by the mobile terminal 200.

The screen 281 includes display areas 282 and 283. The display area 282 displays an image 282a of the excavator 100 at a certain posture and an image 282b of the bucket 6 of the excavator 100 at another posture. It should be noted that the image of the excavator 100 in a certain position may be extracted from the video data included in the state record data 280.

A table 283a and operation buttons 283b and 283c are displayed in the display area 283. The table 283a is a table in which coordinate values indicating the position of a predetermined portion of the excavator 100 in an image of the excavator 100 for each posture are displayed. The operation button 283b is an operation button for acquiring a coordinate value representing a position of the predetermined portion from an image of the excavator 100 at each posture. The operation button 283c is an operation button for transmitting the coordinate value displayed in the table 283a to the excavator 100.

In the present embodiment, when the operation button 283b is operated with the image of the excavator 100 at a certain posture displayed in the display area 282, the coordinate values of the predetermined portion of the excavator 100 in the image are acquired and displayed in the table 283a.

A portion of the table 283a may be displayed in the display area 282. The table 283a may also include a coordinate value indicating the position of the portion other than the portion of the excavator 100 displayed on display area 282 or information regarding the posture other than the posture displayed on display area 282. In this case, in the present embodiment, it is possible to confirm the coordinate values of a portion other than the portion displayed in the display area 282 in FIG. 28, or the coordinate values with respect to a posture other than the posture displayed on the display area 282 in FIG. 28, by performing an operation of a swipe, a pinch-in, a pinch-out, or the like in the display area 282.

In the present embodiment, predetermined portions of the excavator 100 are the boom foot, the boom top, the arm foot, the arm top, the bucket pin, and the claw tip of a bucket.

In the example of FIG. 28, an image 282b is an image illustrating the position of the bucket 6 when the image of the excavator 100 displayed on the display area 282 indicates a posture of "posture 1". In the present embodiment, when the image of the excavator 100 displayed on the display area 282 indicates a posture of "posture 1", and the operation button 283b is operated, the coordinates indicating the position of the boom foot, the boom top, the arm foot, the arm top, the bucket pin, and the claw tip of the bucket in the image at this time are acquired, and are displayed in the table 284a.

The image 282a is an image of the excavator 100 when the posture of the excavator 100 is "posture 2". In this state, when the operation button 283b is operated, coordinate values indicating the position of the boom foot, the boom top, the arm foot, the arm top, the bucket pin, and the claw tip of the bucket in the image 282a are acquired. The posture of the excavator 100, such as "posture 1" and "posture 2," may be predetermined. In the present embodiment, the process for obtaining the coordinate values may be performed by the mobile terminal 200.

The mobile terminal 200 according to the present embodiment acquires the coordinate value of each portion at each posture, and transmits the information representing the acquired coordinate value for each posture to the excavator 100 when the operation button 283c is operated.

When the excavator 100 receives information indicating the coordinate values of a predetermined portion of each posture, the excavator 100 calibrates the various parameters based on this information. Various parameters are, for example, lengths, angles, etc., between predetermined portions at a certain posture. Upon completion of the calibration, the excavator 100 may send a notification indicating that the calibration has been completed and each parameter and value after calibration to the mobile terminal 200.

When the mobile terminal 200 acquires the parameters after calibration, the mobile terminal 200 may transmit the parameters after calibration to the management apparatus 300 to be stored in the management information database 310.

Further, when the coordinate value of each portion at each posture is acquired, the mobile terminal 200 according to the present embodiment may acquire, from the state quantity information, the detection value of the sensor when an image of each posture is captured, and transmit a calibration instruction to the excavator 100 based on the coordinate value of each portion and the detection value included in the state quantity information.

In the present embodiment, the image of the excavator 100 at a predetermined posture is acquired from the video data included in the state record data 280, but the image is not limited thereto. In the present embodiment, for example, the image of the excavator 100 may be captured by the imaging device 208 when the excavator 100 is at a certain posture.

Therefore, in the present embodiment, for example, a signal indicating that an image is to be captured may be sent to the excavator 100. The excavator 100 may maintain a certain posture upon receiving this signal.

In the present embodiment, when the excavator 100 is at a predetermined posture, a signal notifying this may be transmitted to the mobile terminal 200. In this case, the user of the mobile terminal 200 may capture the excavator 100 by the imaging device 208 after receiving the notification from the mobile terminal 200.

In the present embodiment, an image of the excavator 100 in a predetermined posture can be captured as described above.

As described above, according to the present embodiment, the state record data 280 in which an image (including a video and a still image) of the excavator 100 captured by the mobile terminal 200 is associated with the operation data received from the excavator 100 during the period when the image of the excavator 100 is being captured is used to diagnose and evaluate the operation of the excavator 100.

Accordingly, in the present embodiment, matters that cannot be determined from a comparison of a detection value of the sensor of the excavator 100 and an instruction value can be determined by an image of the excavator 100, and the user of the mobile terminal 200 can identify the state of the excavator 100.

In the present embodiment, the mobile terminal 200 may include the functions of the diagnosis part 340 and the operation evaluating part 350 that are included in the management apparatus 300. In this case, the mobile terminal 200 may transmit, by the communication control part 220, the information representing the diagnosis result and the information representing the evaluation result to the management apparatus 300 together with the state record data 280.

While one embodiment of the present invention has been described in detail above, the present invention is not limited to these embodiments, and various modifications or variations are possible within the scope of the present invention as defined in the appended claims.

For example, in each of the above-described embodiments, the mobile terminal 200 has a function to transmit the video of the excavator 100. However, the present invention is not limited thereto. The mobile terminal 200 does not need to have a function to transmit the video of the excavator 100.

For example, in each of the above-described embodiments, the mobile terminal 200 has a function to display the video of the excavator 100 and the state quantity information of the excavator 100 in synchronization with each other. However, the present invention is not limited thereto, and the mobile terminal 200 does not need to have a function to display the video of the excavator 100 and the state quantity information of the excavator 100 in synchronization with each other.

For example, in each of the above-described embodiments, the mobile terminal 200 can display both the video of the excavator 100 and the state quantity information of the excavator 100. However, the present invention is not limited thereto, and the mobile terminal 200 may transmit a request signal to the excavator 100 without starting the video, acquire the state quantity information from the excavator 100, and display only the state quantity information.

For example, in the above-described embodiments, the excavator 100 transmits a plurality of kinds of state quantity information to the mobile terminal 200 in real time. However, the present invention is not limited thereto, and the excavator 100 may transmit a plurality of kinds of state quantity information collectively to the mobile terminal 200 at any timing (for example, at a timing when the recording of the video of the excavator 100 ends, at a timing when a predetermined recording time has elapsed, at a timing when the state quantity information has been acquired, or the like).

According to one embodiment of the present invention, it is possible to confirm the state of the excavator when the excavator has been operating.

What is claimed is:

1. An excavator management system comprising:
an excavator configured to acquire a plurality of state quantities of the excavator detected by a plurality of sensors; and
a mobile terminal, wherein
the mobile terminal includes
a hardware processor configured to
transmit, to the excavator, a request signal requesting the excavator to transmit the plurality of state quantities,
record a video of the excavator,
start to receive the plurality of state quantities from the excavator in response to starting to record the video of the excavator, and
display one or more state quantities among the plurality of state quantities received from the excavator and the video of the excavator in synchronization with each other on a display.

2. The excavator management system according to claim 1, wherein
the mobile terminal further includes
an imaging device configured to capture the video of the excavator in synchronization with a period during which the plurality of state quantities are received.

3. The excavator management system according to claim 2, wherein
the hardware processor is further configured to display a recording screen on the display in response to receiving an instruction to record the video of the excavator, and
the video of the excavator that is being recorded and a waveform of at least one state quantity included in the plurality of state quantities are simultaneously displayed on the recording screen.

4. The excavator management system according to claim 3, wherein information by which the excavator is identified, information indicating a date and time of starting to record the video, and information indicating an operation being performed by the excavator are displayed on the recording screen.

5. The excavator management system according to claim 2, wherein
the hardware processor is further configured to
display a screen including a list of one or more prescribed operations of the excavator on the display, and
transmit, to the excavator, an operation instruction to perform a prescribed operation selected from the list of the one or more prescribed operations, and
the video of the excavator is obtained by capturing an image of the excavator that is performing the selected prescribed operation.

6. The excavator management system according to claim 2, wherein
the hardware processor is further configured to
display, on the display, a selection screen for selecting, as an operation performed by the excavator, an operation according to an operation by an operator or an unmanned operation, and
display, on the display, a confirmation screen including information to prompt confirmation as to whether there is an obstacle around the excavator, in response to determining that the unmanned operation is selected.

7. The excavator management system according to claim 2, wherein
the mobile terminal further includes
a storage configured to store state record data in which the plurality of state quantities and the video of the excavator recorded while the plurality of state quantities are received are associated with each other, and
the hardware processor is further configured to play back the state record data stored in the storage.

8. The excavator management system according to claim 7, wherein
the hardware processor is further configured to
display a playback screen of the state record data on the display, and
play back the state record data stored in the storage, in response to receiving, on the playback screen, an instruction to play back the state record data.

9. The excavator management system according to claim 8, wherein
a video representing video data included in the state record data and a waveform of the one or more state quantities included in the state record data are displayed on the playback screen.

10. The excavator management system according to claim 9, wherein
another video captured by a camera included in the excavator is displayed together with the video and the waveform on the playback screen.

11. The excavator management system according to claim 7, further comprising:

a management apparatus configured to perform communication with the mobile terminal, wherein the management apparatus includes a hardware processor configured to acquire the state record data from the mobile terminal;

diagnose a state of the excavator based on the state record data;

evaluate an operation of the excavator based on the state record data; and output a result of diagnosing the state of the excavator and a result of evaluating the operation of the excavator to the mobile terminal.

12. The excavator management system according to claim 1, wherein the hardware processor is configured to display the one or more state quantities and the video of the excavator in synchronization with each other such that as the video of the excavator is played back, a value of the one or more state quantities corresponding to a playback time of the video of the excavator is indicated.

13. The excavator management system according to claim 1, wherein the hardware processor is further configured to display, on the display, a screen for specifying the one or more state quantities from the plurality of state quantities and display the one or more state quantities specified on the screen and the video of the excavator in synchronization with each other on the display.

14. The excavator management system according to claim 1, wherein the mobile terminal includes an operation button and, wherein the hardware processor is configured to (i) record the video and start to receive the plurality of state quantities from the excavator in response to an operation of the operation button, or (ii) stop receiving the plurality of state quantities from the excavator in response to stopping recording of the video.

15. The excavator management system according to claim 1, wherein the received plurality of state quantities includes a hydraulic oil temperature, an engine water temperature, an engine fuel injection amount, a hydraulic pressure of a boom cylinder, a hydraulic pressure of an arm cylinder, a hydraulic pressure of a bucket cylinder, a hydraulic pressure of a turning hydraulic motor, a discharge pressure of a main pump, an operation pressure of an operation lever, or a control pressure of a regulator.

16. A mobile terminal comprising:

a hardware processor configured to transmit, to an excavator that acquires a plurality of state quantities of the excavator detected by a plurality of sensors, a request signal requesting the excavator to transmit the plurality of state quantities, record a video of the excavator, start to receive the plurality of state quantities from the excavator in response to starting to record the video of the excavator, and display one or more state quantities among the plurality of state quantities received from the excavator and the video of the excavator in synchronization with each other on a display.

17. The mobile terminal according to claim 16, wherein the hardware processor is further configured to display, on the display, a screen for specifying the one or more state quantities from the plurality of state quantities and display the one or more state quantities specified on the screen and the video of the excavator in synchronization with each other on the display.

18. A non-transitory computer-readable recording medium storing a program that causes a computer of a mobile terminal to execute a process, the process comprising:

transmitting, to an excavator that acquires a plurality of state quantities of the excavator detected by a plurality of sensors, a request signal requesting the excavator to transmit the plurality of state quantities, recording a video of the excavator, starting to receive the plurality of state quantities from the excavator in response to starting to record the video of the excavator, and displaying one or more state quantities among the plurality of state quantities received from the excavator and the video of the excavator in synchronization with each other on a display.

19. The non-transitory computer-readable recording medium according to claim 18, wherein the process further comprises displaying, on the display, a screen for specifying the one or more state quantities from the plurality of state quantities, and the one or more state quantities specified on the screen and the video of the excavator are displayed in synchronization with each other on the display.

* * * * *